United States Patent
Tsukuda et al.

(10) Patent No.: US 10,431,794 B2
(45) Date of Patent: Oct. 1, 2019

(54) METHOD FOR PRODUCING ASSEMBLY, AND ASSEMBLY

(71) Applicant: Sumitomo Chemical Company, Limited, Chuo-ku, Tokyo (JP)

(72) Inventors: Yosuke Tsukuda, Niihama (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 343 days.

(21) Appl. No.: 15/417,821

(22) Filed: Jan. 27, 2017

(65) Prior Publication Data

US 2017/0222203 A1   Aug. 3, 2017

(30) Foreign Application Priority Data

Jan. 29, 2016   (JP) ................. 2016-016006

(51) Int. Cl.
| | |
|---|---|
| *H01M 2/14* | (2006.01) |
| *B65H 19/22* | (2006.01) |
| *H01M 2/16* | (2006.01) |
| *B26D 7/00* | (2006.01) |
| *H01M 10/0525* | (2010.01) |
| *H01M 10/0587* | (2010.01) |

(52) U.S. Cl.
CPC ........ *H01M 2/145* (2013.01); *B65H 19/2284* (2013.01); *H01M 2/1653* (2013.01); *H01M 2/1686* (2013.01); *B26D 2007/0075* (2013.01); *B65H 2301/4148* (2013.01); *B65H 2301/41485* (2013.01); *H01M 10/0525* (2013.01); *H01M 10/0587* (2013.01)

(58) Field of Classification Search
CPC ........ B65H 19/2284; B65H 2301/4148; B65H 2301/41485; H01M 10/0525; H01M 10/0587; H01M 2/145; H01M 2/1653; H01M 2/1686; B26D 2007/0075
See application file for complete search history.

(56) References Cited

U.S. PATENT DOCUMENTS

| | | | | |
|---|---|---|---|---|
| 2,422,045 | A * | 6/1947 | Ruben ................. | H01M 2/0413 220/378 |
| 10,026,940 | B2 * | 7/2018 | Yashiki ................. | H01M 2/145 |
| 2014/0295068 | A1 * | 10/2014 | Nanba ................. | H01M 4/0404 427/122 |
| 2016/0190640 | A1 * | 6/2016 | Visco .................. | H01M 10/052 429/322 |
| 2017/0222202 | A1 * | 8/2017 | Yashiki ................. | H01M 2/145 |
| 2017/0244083 | A1 * | 8/2017 | Yashiki ................. | B65H 18/00 |
| 2017/0346061 | A1 * | 11/2017 | Yashiki ................. | B32B 27/00 |
| 2018/0131040 | A1 * | 5/2018 | Visco ................ | H01M 10/0562 |

FOREIGN PATENT DOCUMENTS

JP    2010-274922 A    12/2010

* cited by examiner

*Primary Examiner* — Michael E Gallion
(74) *Attorney, Agent, or Firm* — Panitch Schwarze Belisario & Nadel LLP

(57) ABSTRACT

To provide (i) a method for producing an assembly capable of protecting a film from external force during, for example, transport and (ii) such an assembly, a method for producing an assembly includes a step of inserting a pillar-shaped core member through a plurality of separator rolls and a buffer member(s) made of a flexibility material and provided between separator rolls such that the separator rolls and the buffer member(s) are arranged alternately.

9 Claims, 14 Drawing Sheets

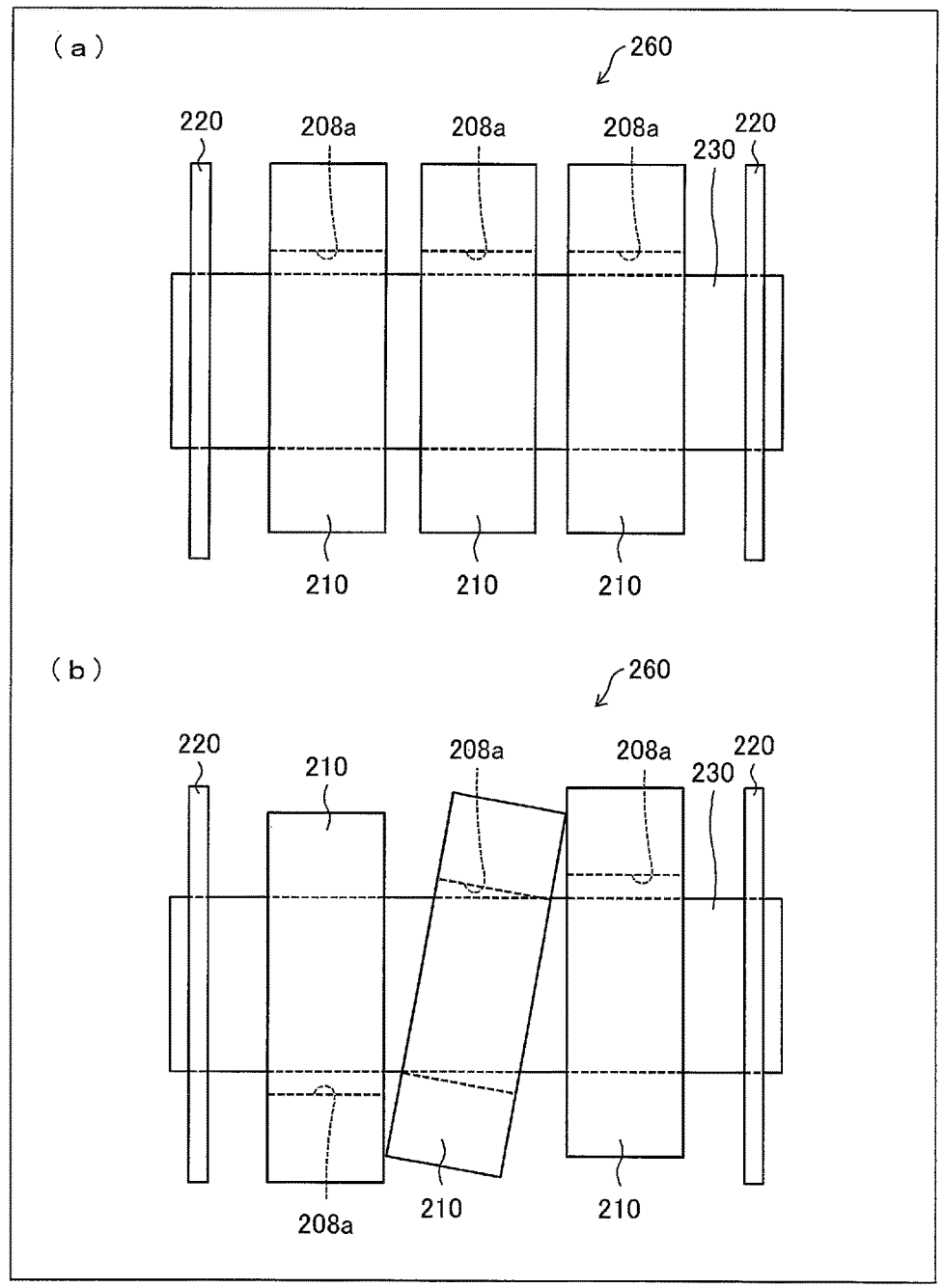

METHOD FOR PRODUCING ASSEMBLY, AND ASSEMBLY

This Nonprovisional application claims priority under 35 U.S.C. § 119 on Patent Application No. 2016-016006 filed in Japan on Jan. 29, 2016, the entire contents of which are hereby incorporated by reference.

TECHNICAL FIELD

The present invention relates to (i) a method for producing an assembly including a roll of a film and a core member inserted in the roll and (ii) such an assembly.

BACKGROUND ART

A lithium-ion secondary battery includes therein a positive electrode and a negative electrode which are separated by a porous separator. In production of lithium ion secondary batteries, a separator roll is used. The separator roll is obtained by winding this separator around a core having a cylindrical shape. The separator roll has a hollow core, into which a core member is inserted to form an assembly for transport or storage.

(a) of FIG. 17 is a diagram illustrating a configuration of a conventional assembly. As illustrated in (a) of FIG. 17, an assembly 260 includes a plurality of separator rolls 210 and a pillar-shaped core member 230 extending through the respective axis holes 208a of the separator rolls 210. The core member 230 has opposite ends each fitted with a protector 220. The protectors 220 each have a plate shape and have an opening at a central portion. The opposite ends of the core member 230 are each inserted into the opening of a protector 220 so that the core member 230 is supported by the protectors 220.

Patent Literature 1 discloses a packaging apparatus that automatically prepares an assembly by combining a core member with separator rolls and spacers such that the core member is inserted through the separator rolls and the spacers alternately. This packaging apparatus forms an assembly including a plurality of separator rolls and spacers provided therebetween.

CITATION LIST

Patent Literature

[Patent Literature 1]
Japanese Patent Application Publication, Tokukai, No. 2010-274922 A (Publication Date: Dec. 9, 2010)

SUMMARY OF INVENTION

Technical Problem (b) of FIG. 17 is a diagram illustrating an assembly 260 to which external force has been applied.

The core member 230 is inserted into the axis hole 208a in the core of each separator roll 210. Separator rolls 210 are each designed to have an axis hole 208a with a diameter larger to a degree than the outer diameter of the core member 230 in view of a possible error during the assembly.

Thus, in a case where the gap between the separator rolls 210 is large, external force such as a shake or impact applied to the assembly 260 causes a separator roll 210 to come into contact with and rub against an adjacent separator roll 210 (see (b) of FIG. 17), deforming those separator rolls 210. In particular, if a separator 12 wound around a core comes into contact with and rubs against an adjacent separator roll 210, that separator 12 may become unusable.

The assembly disclosed in Patent Literature 1 includes a spacer between separator rolls supported by a core member. This configuration is intended to allow the gap between separator rolls to be reduced to a degree.

Patent Literature 1 is, however, silent about the material of the spacer. In a case where the spacer is made of a firm material, there will be only a small frictional force between the spacer and separator rolls. This indicates that even the configuration of Patent Literature 1 is unable to prevent separator rolls and a spacer from rubbing against each other in a case where external force has been applied to the assembly.

In addition, in the case where the spacer is made of a firm material, the spacer rubbing against the core of a separator roll or a separator will likely cause foreign matter to be generated. If such foreign matter has adhered to a separator, the separator may become unusable.

The present invention has been accomplished in view of the above issue, and serves to provide (i) a method for producing an assembly capable of protecting a film from external force during, for example, transport and (ii) such an assembly.

Solution to Problem

In order to attain the above object, a method of an embodiment of the present invention for producing an assembly is a method for producing an assembly including (i) a core member having a pillar shape, (ii) a plurality of rolls each of which includes a core and a film wound around the core and has an axis hole, and (iii) at least one first buffer member made of a flexible material and having an axis hole, the method including the step of: (a) inserting the core member through the respective axis holes of the rolls and the axis hole of the at least one first buffer member for an alternate arrangement of the rolls and the at least one first buffer member.

In order to attain the above object, an assembly of an embodiment of the present invention is an assembly, including: a plurality of rolls each including a core and a film wound around the core; at least one first buffer member made of a flexible material and provided between two mutually adjacent ones of the rolls; and a core member having a pillar shape, the core member extending through respective axis holes of the rolls and an axis hole of the at least one first buffer member and supporting the rolls and the at least one first buffer member.

Advantageous Effects of Invention

An embodiment of the present invention provides (i) a method for producing an assembly capable of protecting a film from external force during, for example, transport and (ii) such an assembly.

BRIEF DESCRIPTION OF DRAWINGS

FIG. 17 provides diagrams each illustrating a configuration of a conventional assembly.

DESCRIPTION OF EMBODIMENTS

[Embodiment 1]

The following description will first discuss basic elements of a battery separator as a separator included in an assembly of an embodiment of the present invention. Specifically, the description below deals in sequence with a lithium-ion secondary battery, a separator, a heat-resistant separator, a method for producing a separator/heat-resistant separator, a slitting apparatus, and a cutting device.

(Lithium-Ion Secondary Battery)

A nonaqueous electrolyte secondary battery, typified by a lithium-ion secondary battery, has a high energy density, and therefore is currently and widely used as (i) batteries for use in devices such as personal computers, mobile phones, and mobile information terminals, (ii) moving bodies such as automobiles and airplanes, and (iii) stationary batteries contributing to stable power supply.

Figure 1:
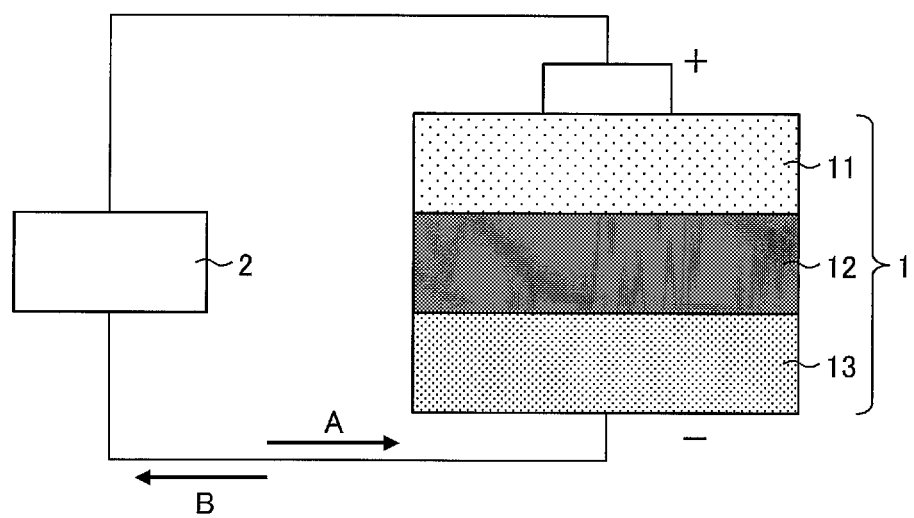
FIG. 1 is a schematic view illustrating a cross sectional configuration of a lithium-ion secondary battery.

FIG. 1 is a schematic view illustrating a cross sectional configuration of a lithium-ion secondary battery 1. As illustrated in FIG. 1, the lithium-ion secondary battery 1 includes a cathode 11, a separator 12 (battery separator), and an anode 13. Between the cathode 11 and the anode 13, an external device 2 is connected outside the lithium-ion secondary battery 1. This causes (i) electrons to move in a direction A while the lithium-ion secondary battery 1 is being charged and (ii) electrons to move in a direction B while the lithium-ion secondary battery 1 is being discharged.

(Separator)

The separator 12 is provided so as to be sandwiched between (i) the cathode 11 which is a positive electrode of the lithium-ion secondary battery 1 and (ii) the anode 13 which is a negative electrode of the lithium-ion secondary battery 1. The separator 12 is a porous film which causes the cathode 11 and the anode 13 to be separated and allows lithium ions to move between the cathode 11 and the anode 13. Materials of the separator 12 include polyolefin such as polyethylene or polypropylene.

Figure 2:
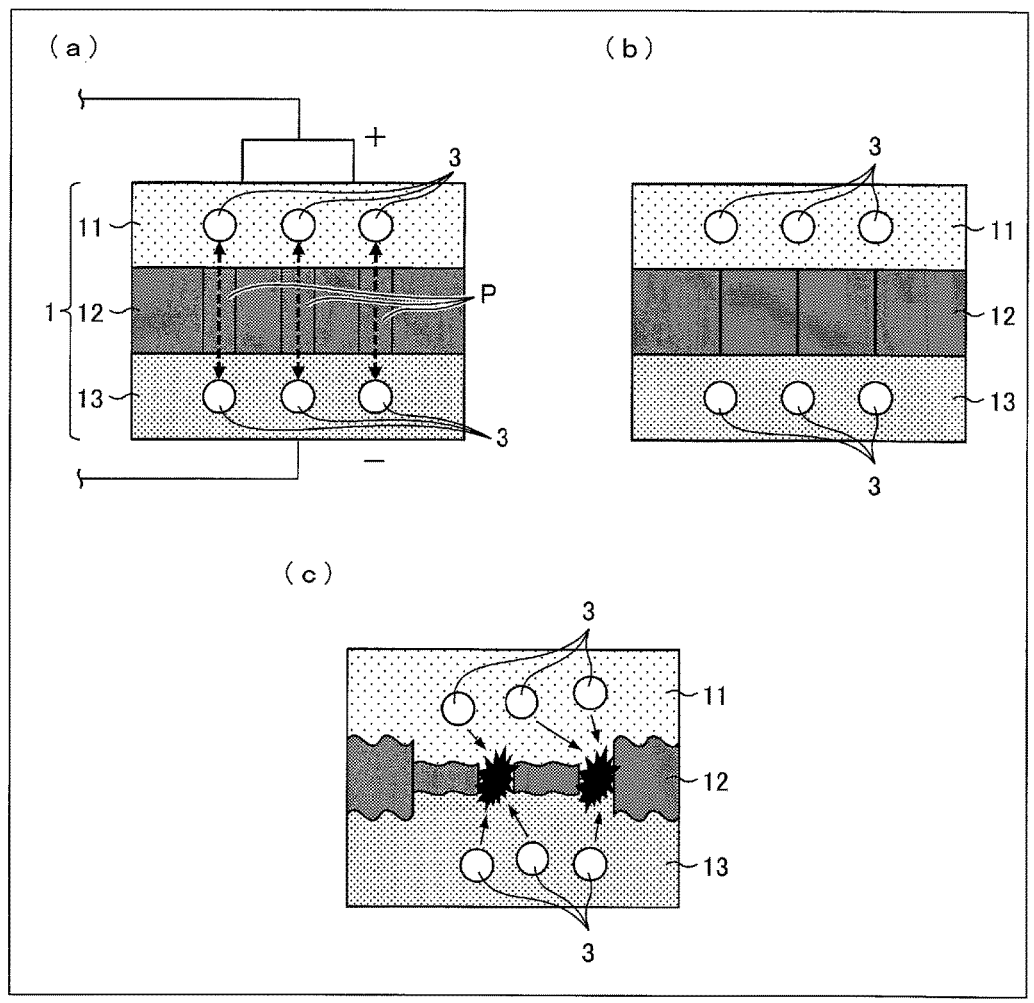
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1, (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen. As illustrated in (a) of FIG. 2, the separator 12 has many pores P. Normally, lithium ions 3 can move back and forth in the lithium-ion secondary battery 1, through the pores P.

The temperature of the lithium-ion secondary battery 1 may rise due to, for example, excessive charging of the lithium-ion secondary battery 1 or a high current caused by short-circuiting of the external device. This causes the separator 12 to be melt or soften, so that the pores P are blocked as illustrated in (b) of FIG. 2. As a result, the separator 12 shrinks. This causes the lithium ions 3 to stop moving back-and-forth, and ultimately causes the temperature of the lithium-ion secondary battery 1 to stop rising.

Note, however, that in a case where a temperature of the lithium-ion secondary battery 1 sharply rises, the separator 12 suddenly shrinks. In this case, the separator 12 may be destroyed (see (c) of FIG. 2). This causes the lithium ions 3 to leak out from the separator 12 which has been destroyed. As a result, the lithium ions 3 will never stop moving back and forth. Consequently, the temperature continues to rise.

(Heat-Resistant Separator)

Figure 3:
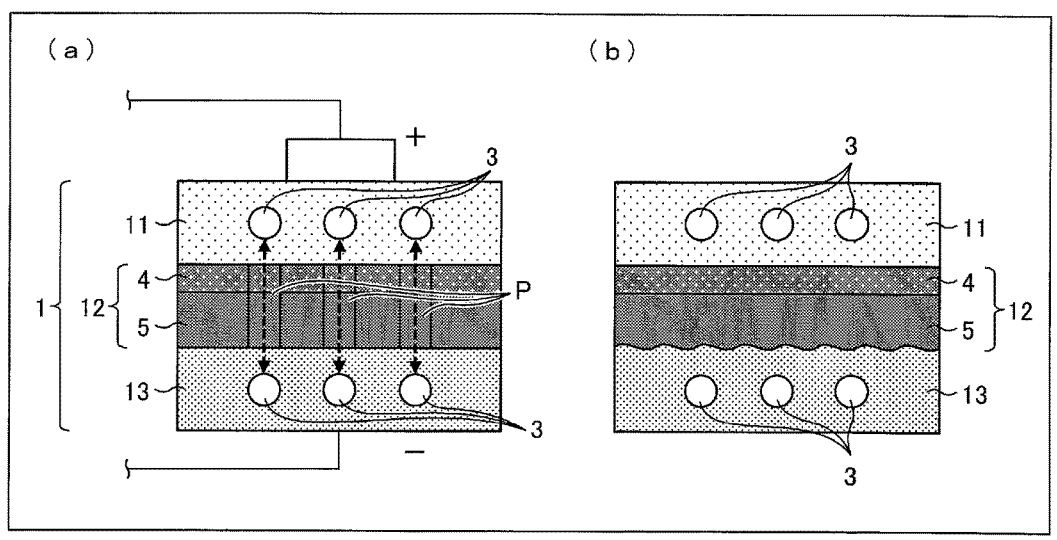
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen. As illustrated in (a) of FIG. 3, the separator 12 can be a heat-resistant separator including a porous film 5 and a heat-resistant layer 4. The heat-resistant layer 4 is stacked on a surface of the porous film 5 which surface is on a cathode 11 side. Note that the heat-resistant layer 4 can be alternatively stacked (i) on a surface of the porous film 5 which surface is on an anode 13 side or (ii) on both surfaces of the porous film 5. Furthermore, the heat-resistant layer 4 has pores which are similar to the pores P. Normally, the lithium ions 3 move back and forth through the pores P and the pores of the heat-resistant layer 4. Materials of the heat-resistant layer 4 include wholly aromatic polyamide (aramid resin).

Even in a case where the porous film 5 melts or softens due to a sharp rise in temperature of the lithium-ion secondary battery 1, the shape of the porous film 5 is maintained (see (b) of FIG. 3) because the heat-resistant layer 4 supports the porous film 5. This causes the porous film 5 to come off with melting or softening. Therefore, the pores P only blocks up. This causes the lithium ions 3 to stop moving back and forth, and ultimately causes the above-described excessive discharging or excessive charging to stop. In this way, the separator 12 is prevented from being destroyed.

(Production Steps of Separator and Heat-Resistant Separator)

How to produce the separator and the heat-resistant separator of the lithium-ion secondary battery 1 is not specifically limited. The separator and the heat-resistant separator can be produced by a well-known method. The following discussion assumes a case where the porous film 5 contains polyethylene as a main material. Note, however, that even in a case where the porous film 5 contains another material, the separator 12 (heat-resistant separator) can be produced by employing a similar production method.

Examples of such a similar production method encompass a method which includes the steps of forming a film by adding inorganic filler or a plasticizer to a thermoplastic resin, and then removing the inorganic filler or the plasticizer by means of an appropriate solvent. For example, in a case where the porous film 5 is a polyolefin separator made of a polyethylene resin containing ultra-high molecular weight polyethylene, it is possible to produce the porous film 5 by the following method.

This method includes (1) a kneading step of obtaining a polyethylene resin composition by kneading a ultra-high molecular weight polyethylene with (i) an inorganic filler (such as calcium carbonate or silica) or (ii) a plasticizer (such as low molecular weight polyolefin or fluid paraffin), (2) a rolling step of forming a film by means of the polyethylene resin composition, (3) a removal step of removing the inorganic filler or the plasticizer from the film obtained in the step (2), and (4) a stretching step of obtaining the porous film 5 by stretching the film obtained in the step (3). The step (4) can be alternatively carried out between the steps (2) and (3).

In the removal step, many fine pores are formed in the film. The fine pores of the film stretched in the stretching step serve as the above-described pores P. The porous film 5 (separator 12 having no heat-resistant layer) is thus obtained. Note that the porous film 5 is a polyethylene microporous film having a prescribed thickness and a prescribed air permeability.

Note that, in the kneading step, (i) 100 parts by weight of the ultra-high molecular weight polyethylene, (ii) 5 parts by weight to 200 parts by weight of a low-molecular weight polyolefin having a weight-average molecular weight of 10000 or less, and (iii) 100 parts by weight to 400 parts by weight of the inorganic filler can be kneaded.

Thereafter, in a coating step, the heat-resistant layer 4 is formed on the porous film 5. For example, by applying, onto the porous film 5, an aramid/NMP (N-methylpyrrolidone) solution (coating solution), the heat-resistant layer 4 that is an aramid neat-resistant layer is formed. The heat-resistant layer 4 can be formed on a single surface or both surfaces of the porous film 5. Alternatively, the heat-resistant layer 4 can be formed on the porous film 5, by applying, on the porous film 5, a mixed solution containing a filler such as alumina or carboxymethyl cellulose.

Note that, in the coating step, an adhesive layer can be formed on the porous film 5, by applying a vinylidene polyfluoride or dimethyl acetoamide solution (coating solution) on the porous film 5 (application step) and solidifying the vinylidene polyfluoride or dimethyl acetoamide solution (solidifying step). The adhesive layer can be formed on a single surface of the porous film 5 or on both surfaces of the porous film 5.

A method of coating the porous film 5 with a coating solution is not specifically limited, provided that uniform wet coating can be carried out by the method. The method can be a conventionally publicly known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film or a solid-content concentration in the coating solution.

It is possible to use a resin film, a metal belt, a drum or the like as a support with which the porous film 5 is fixed or conveyed in coating.

It is thus possible to produce the separator 12 (heat-resistant separator) in which the heat-resistant layer 4 is stacked on the porous film 5. The separator thus produced is wound around a core having a cylindrical shape. Note that a subject to be produced by the above production method is not limited to the heat-resistant separator. The above production method does not necessarily include the coating step. In a case where no coating step is included in the method, the subject to be produced is a separator having no heat-resistant layer. Alternatively, an adhesive separator having other functional layer (such as later-described adhesive layer), instead of the heat-resistant layer, can be produced by a production method similar to that of the heat-resistant separator.

(Slitting Apparatus)

The heat resistant separator or the separator including no heat resistant layer (hereinafter, referred to as "separator") preferably has a width (hereinafter, referred to as "product width") suitable for application products such as the lithium-ion secondary battery 1, Note, however, that the separator is produced so as to have a width that is equal to or larger than a product width, in view of an improvement in productivity. After the separator is once produced, the separator is slit into a separator(s) having the product width.

Note that the "separator width" means a length of the separator in a direction substantially perpendicular to a lengthwise direction and a thickness wise direction of the separator. Hereinafter, a wide separator, which has not subjected to slitting, is referred to as an "original sheet," whereas particularly a separator which has been subjected to slitting is referred to as a "slit separator." Note also that (i) "slitting" means to slit the separator in the lengthwise direction (flow direction of the film during production; MD: Machine direction) and (ii) "cutting" means to slit the separator in a transverse direction (TD). Note that the transverse direction (TD) means a direction which is substantially perpendicular to the lengthwise direction (MD) and the thicknesswise direction of the separator.

Figure 4:
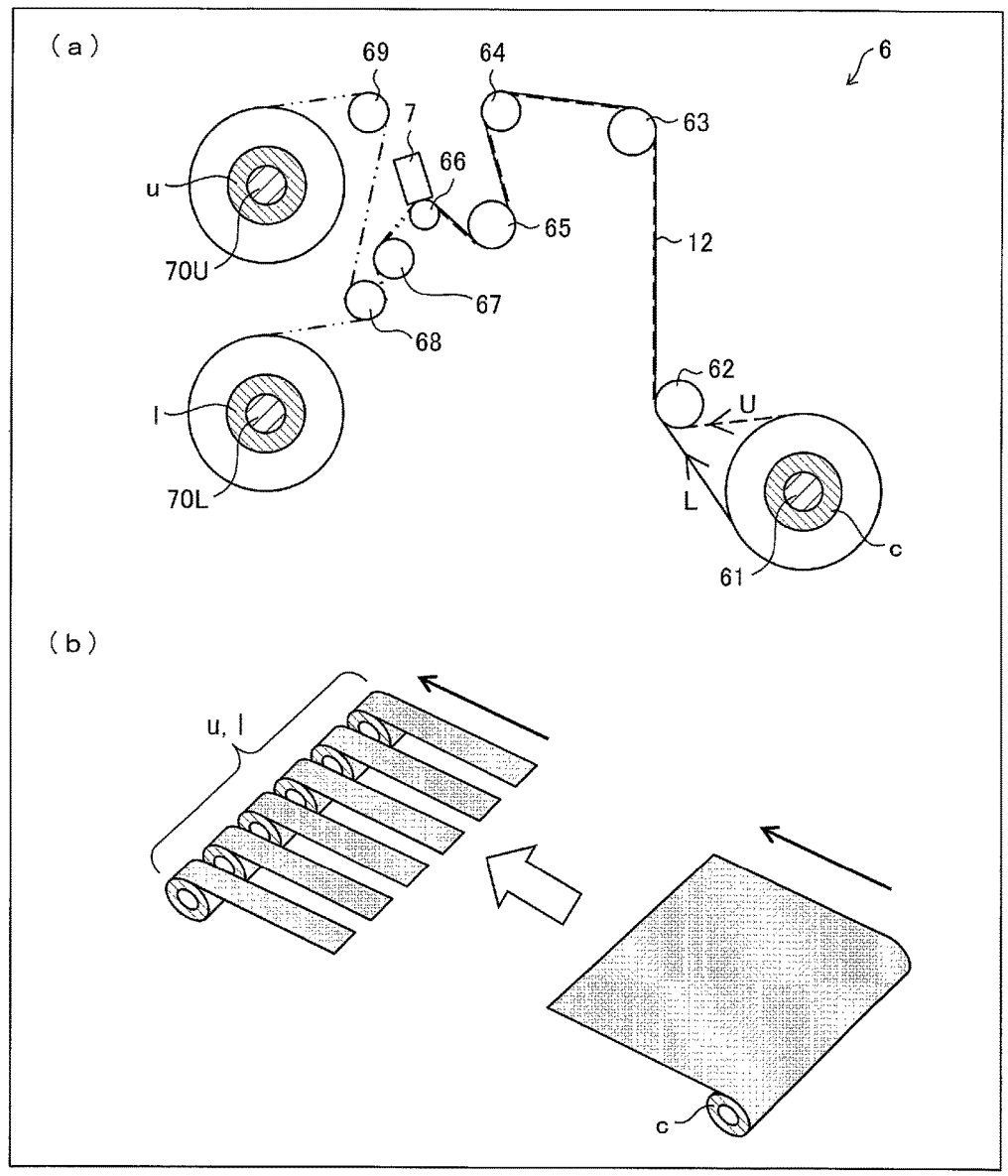
FIG. 4 is a schematic view illustrating a configuration of a slitting apparatus for slitting the separator.

FIG. 4 is a schematic view illustrating a configuration of a slitting apparatus 6 for slitting the separator. (a) of FIG. 4 illustrates an entire configuration, and (b) of FIG. 4 illustrates arrangements before and after slitting the original sheet. As illustrated in (a) of FIG. 4, the slitting apparatus 6 includes a rotatably-supported cylindrical wind-off roller 61, rollers 62 to 69, and take-up rollers 70U and 70L. The slitting apparatus 6 further includes cutting devices 7 described later.

(Before Slitting)

In the slitting apparatus 6, a cylindrical core c around which the original sheet is wrapped is fit on the wind-off roller 61. As illustrated in (b) of FIG. 4, the original sheet is wound off from the core c to a route U or L. The original sheet which has been thus wound off is conveyed to the roller 68, via the rollers 63 through 67. In the conveying step, the original sheet is slit into a plurality of slit separators. Note that the roller 67 is not necessarily provided. In such a case, the original sheet is conveyed from the roller 66 to the roller 68.

(After Slitting (Step of Preparing Separator Roll))

As illustrated in (b) of FIG. 4, in a step of preparing a separator roll, some of the slit separators are wound around respective cylindrical cores u (bobbins), which are fit on the take-up roller 70U. Meanwhile, the others of the plurality of slit separators are wound around respective cylindrical cores l (bobbins), which are fit on the take-up roller 70L. Note that (i) the slit separators each wound around in a roll manner and (ii) the respective cores u and l are, as a whole, referred to as a "roll". This allows for preparation of separator rolls, which are slit separators wound around the cores u and l. Each slit separator has been (i) slit to have a width smaller than the width of a corresponding one of the cores u and l (step of preparing a film) and (ii) wound around the core u or l (step of preparing a roll).

(Cutting Device)

Figure 5:
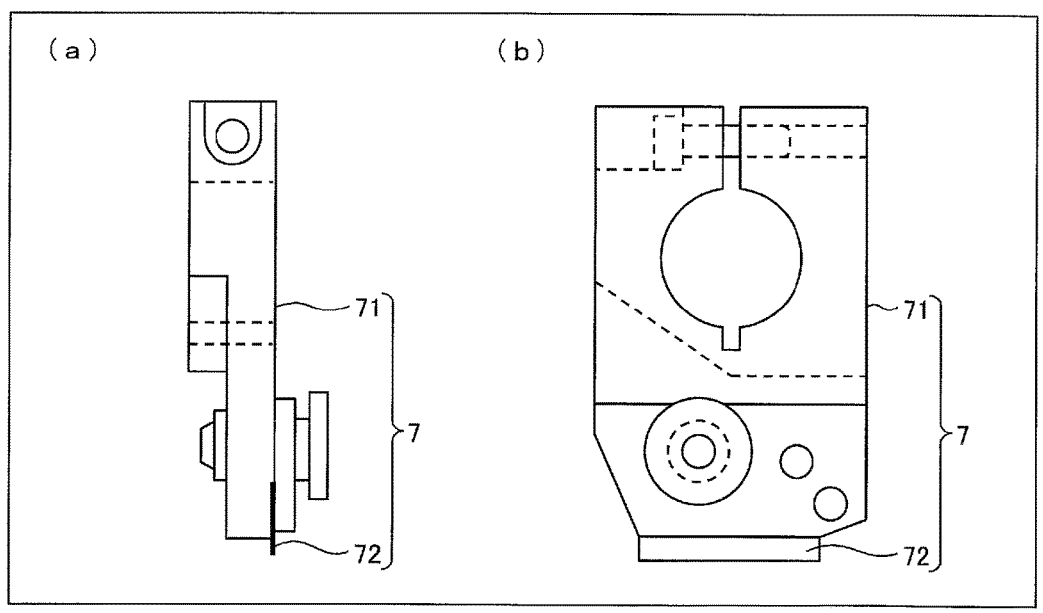
FIG. 5 is a view illustrating a configuration of each of cutting devices in the slitting apparatus illustrated in FIG. 4.

FIG. 5 is a view illustrating a configuration of each of the cutting devices 7 in the slitting apparatus 6 as illustrated in (a) of FIG. 4. (a) of FIG. 5 is a side view of the cutting device 7, and (b) of FIG. 5 is a front view of the cutting device 7. As illustrated in (a) and (b) of FIG. 5, each of the cutting devices 7 includes a holder 71 and a blade 72. The holder 71 is fixed to a housing or the like provided in the slitting apparatus 6. The holder 71 holds the blade 72 such that the blade 72 and original sheet of the separator being conveyed have a fixed positional relation. The blade 72 (i) has a finely sharpened edge and (ii) slits the original sheet of the separator by using the edge.

(Separator Roll)

Figure 6:
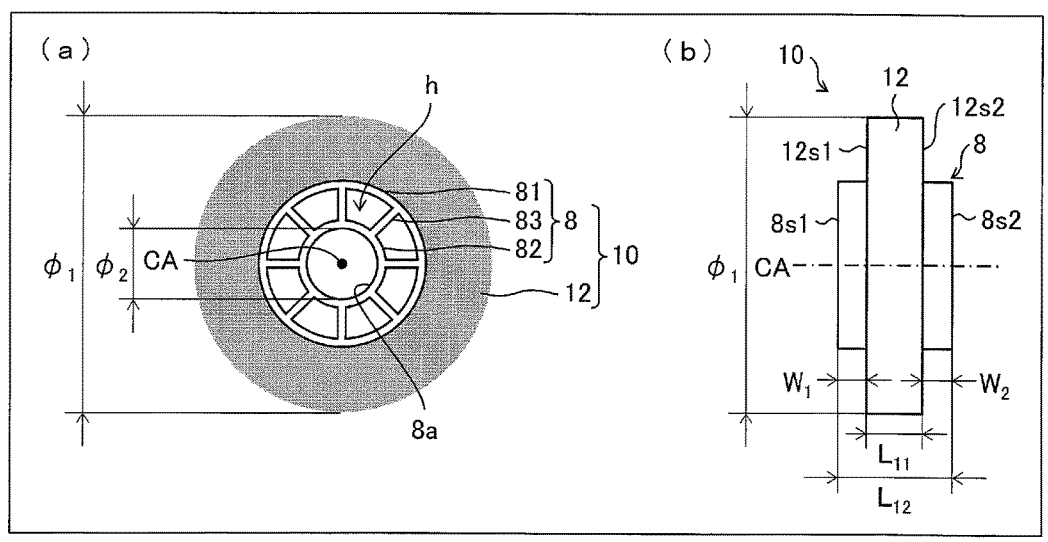
FIG. 6 is a schematic view illustrating a configuration of a separator roll in accordance with Embodiment 1 of the present invention.

FIG. 6 illustrates a configuration of a separator roll 10 in accordance with an embodiment of the present invention. (a) of FIG. 6 is a front view illustrating a configuration of a separator roll 10 including a core 8 and a separator 12 wound around the core 8. (b) of FIG. 6 is a side view of (a) of FIG. 6. As illustrated in (a) and (b) of FIG. 6, the separator roll 10 includes the core 8 around which the separator 12 is wound. The separator 12 is not the original sheet but has been obtained by slitting the original sheet as above.

(Core)

The core 8 corresponds to the core u, l illustrated in (b) of FIG. 4. The core 8, as illustrated in (a) of FIG. 6, includes an outer cylinder part 81, an inner cylinder part 82, and ribs 83 (support members). The core 8 has an axis hole 8a whose center is a central axis CA of the core 8. The axis hole 8a is a through hole into which a tube-shaped core member 30 (see FIG. 8) is inserted.

The outer cylinder part 81 is a cylindrical member having an outer circumferential surface around which the separator 12 is wound. The inner cylinder part 82 is a cylindrical member which is provided inside the outer cylinder part 81 so as to surround the axis hole 8a. The ribs 83 are eight support members which are provided, at intervals, between the outer cylinder part 81 and the Inner cylinder part 82 so as to support them. The core 8 has through holes h each surrounded by the outer cylinder part 81, the inner cylinder part 82, and the ribs 83.

The core 8 is preferably made of a resin such as an ABS resin, a polyethylene resin, a polypropylene resin, a polystyrene resin, or a vinyl chloride resin. The core 8 is preferably not made of metal, paper, or a fluorine resin.

As illustrated in (b) of FIG. 6, the core 8 has a width (that is, the dimension along the central axis CA) $L_{12}$ larger than the width $L_{11}$ of the separator 12. (a) and (b) of FIG. 6 show $\phi_2$, which indicates the inner diameter of the core 8, that is, the diameter of the axis hole 8a.

(Separator)

As illustrated in (a) and (b) of FIG. 6, the separator roll 10 has an outer diameter $\phi_1$ (that is, the outer diameter of the separator 12, wound around the core 8, in a plane orthogonal to the central axis CA) that depends on the outer diameter of the core 8 and the length of the separator 12.

As illustrated in (b) of FIG. 6, the separator 12 has a width $L_{11}$ smaller than the width $L_{12}$ of the core 8. The separator 12 has been slit, in the film preparing step during the step of preparing a separator roll, so that the width $L_{11}$ is suitable for a secondary battery as a product in which the separator 12 is actually used.

The separator 12 has a first end surface 12s1 and a second end surface 12s2 that are perpendicular to the direction in which the axis hole 8a of the core 8 extends. The core 8 has a first end surface 8s1 and a second end surface 8s2 that are perpendicular to the direction in which the axis hole 8a extends.

The separator 12, which has been obtained by slitting the original sheet for a predetermined width, is wound in the roll preparing step such that the first end surface 8s1 of the core 8 protrudes from the first end surface 12s1 of the separator 12 and that the second end surface 8s2 of the core 8 protrudes from the second end surface 12s2 of the separator 12. This allows a separator roll 10 to be prepared.

The separator roll 10 is, as described above, configured such that the opposite end surfaces 8S1 and 8s2 of the core 8 protrude respectively from the corresponding opposite end surfaces 12s1 and 12s2 of the separator 12. The first end surface 8s1 of the core 8 protrudes from the first end surface 12s1 of the separator 12 over a length $W_1$, whereas the second end surface 8s2 of the core 8 protrudes from the second end surface 12s2 of the separator 12 over a length $W_2$, the length $W_1$ and the length $W_2$ being substantially equal to each other.

(Buffer Member)

Figure 7:
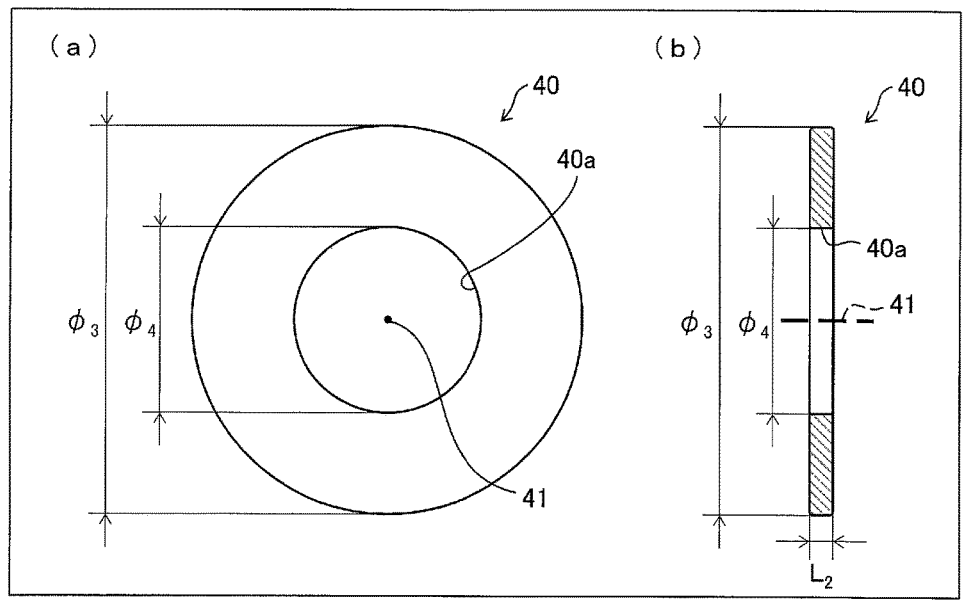
FIG. 7 provides schematic views each illustrating a configuration of a buffer member in accordance with Embodiment 1 of the present invention.

FIG. 7 is a schematic view illustrating a configuration of a buffer member 40 in accordance with an embodiment of the present invention. (a) of FIG. 7 is a front view of the buffer member, whereas (b) of FIG. 7 is a side view of the buffer member.

The buffer member (first buffer member) 40 is in the shape of a circular plate. The buffer member 40 has an axis hole 40a whose center is a central axis 41 of the buffer member 40. The axis hole 40a is a through hole into which a tube-shaped core member 30 (see FIG. 8) is inserted.

The buffer member 40 is made of a flexible material. The buffer member 40 is deformed by external force to absorb the external force. The buffer member 40 can be made of, for example, a porous material such as sponge and urethane foam. The buffer member 40 may alternatively be made of rubber, for example.

The buffer member 40, which is flexible, absorbs a shake of separator rolls 10 in an assembly and impact of a separator roll 10 bumping into another separator roll 10 when the assembly is tilted or transported. The buffer member 40 can thereby protect the separator 12 of each separator roll 10 from a shake and a bump.

(a) and (b) of FIG. 7 show $\phi_3$, which indicates the outer diameter of the buffer member 40 (that is, the outer diameter on an end surface orthogonal to the central axis 41), and $\phi_4$, which indicates the inner diameter of the buffer member 40 (that is, the inner diameter on an end surface orthogonal to the central axis 41; in other words, the diameter of the axis hole 40a). As illustrated in (b) of FIG. 7, the thickness $L_2$ of the buffer member 40 extends along the central axis 41.

The buffer member 40 has a thickness $L_2$ that preferably allows the buffer member 40 to absorb a shake during transport for protection of the end surfaces of each separator roll 10. The buffer member 40 has an outer diameter $\varphi_3$ that is preferably larger than the outer diameter $\phi_1$ of each separator roll 10 for protection of the entire end surfaces of each separator roll 10. The buffer member 40 has an inner diameter $\phi_4$ that is preferably slightly larger than the outer diameter $\phi_5$ of a core member 30 described below so that the core member 30 is easily inserted into the axis hole 40a of the buffer member 40.

(Core Member)

Figure 8:
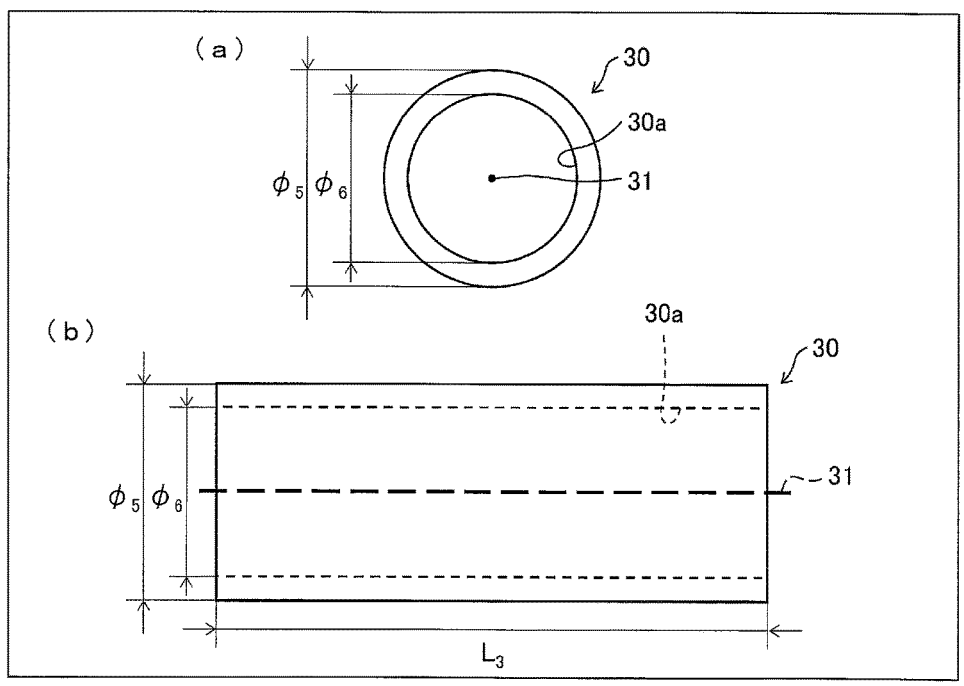
FIG. 8 provides schematic views each illustrating a configuration of a core member in accordance with Embodiment 1 of the present invention.

FIG. 8 is a schematic view illustrating a configuration of a core member 30 of Embodiment 1 of the present invention. (a) of FIG. 8 is a front view of the core member 30, whereas (b) of FIG. 8 is a side view of the core member 30.

The core member 30 is a cylindrical pipe. The core member 30 has an axis hole 30a whose center is a central axis 31 of the core member 30.

The core member 30 may be made of any material that can support a predetermined weight (that is, the total weight of separator rolls 10 and buffer members 40 through which the core member 30 is inserted). The material is, for example, a hard resin. The predetermined weight is, for example, the sum of the respective weights of four separator rolls 10 and five buffer members 40. The core member 30 may be made of a material containing a resin such as an ABS resin, a polyethylene resin, a polypropylene resin, a polystyrene resin, and a vinyl chloride resin, or may be made of paper.

The core member 30, which is made of a hard resin, can support a predetermined weight (that is, the total weight of separator rolls 10 and buffer members 40 through which the core member 30 is inserted).

The core member 30 is made of, for example, a resin such as an ABS resin, a polyethylene resin, a polypropylene resin, a polystyrene resin, or a vinyl chloride resin. The core member 30 is preferably not made of metal, paper, or a fluorine resin.

(a) and (b) of FIG. 8 show $\phi_5$, which indicates the outer diameter of the core member 30 (that is, the outer diameter on an end surface orthogonal to the central axis 31), and $\phi_6$, which indicates the inner diameter of the core member 30 (that is, the inner diameter on a surface orthogonal to the central axis 31; in other words, the diameter of the axis hole 30a).

The core member 30 has a length (that is, the dimension along the central axis 31) $L_3$ that simply needs to be large enough for the core member 30 to support a predetermined number of separator rolls 10 and a predetermined number of buffer members 40 through which the core member 30 is inserted.

The core member 30 has an outer diameter $\phi_5$ that simply needs to allow the core member 30 to be inserted in the axis hole 8a of the core 8 and the axis hole 40a of the buffer member 40. Stated differently, the core 8 and the buffer member 40 simply need to have respective axis holes 8a and 40a having respective diameters (namely, the diameter $\phi_2$ and the inner diameter $\phi_4$) larger than the outer diameter $\phi_5$ of the core member 30. Further, the outer diameter $\phi_5$ of the core member 30 is preferably close to the inner diameter $\phi_2$ of the core 8 so that separator rolls 10 through which the core member 30 is inserted are stable in position.

The core member 30 has an inner diameter $\phi_6$ that simply needs to allow the support part 22 of a protector 20 described below to be fitted in the core member 30. Further, the inner diameter $\phi_6$ of the core member 30 simply needs to allow the core member 30 to be thin and light in weight to the extent that the core member 30 will not be deformed under a predetermined weight.

(Protector 20)

Figure 9:
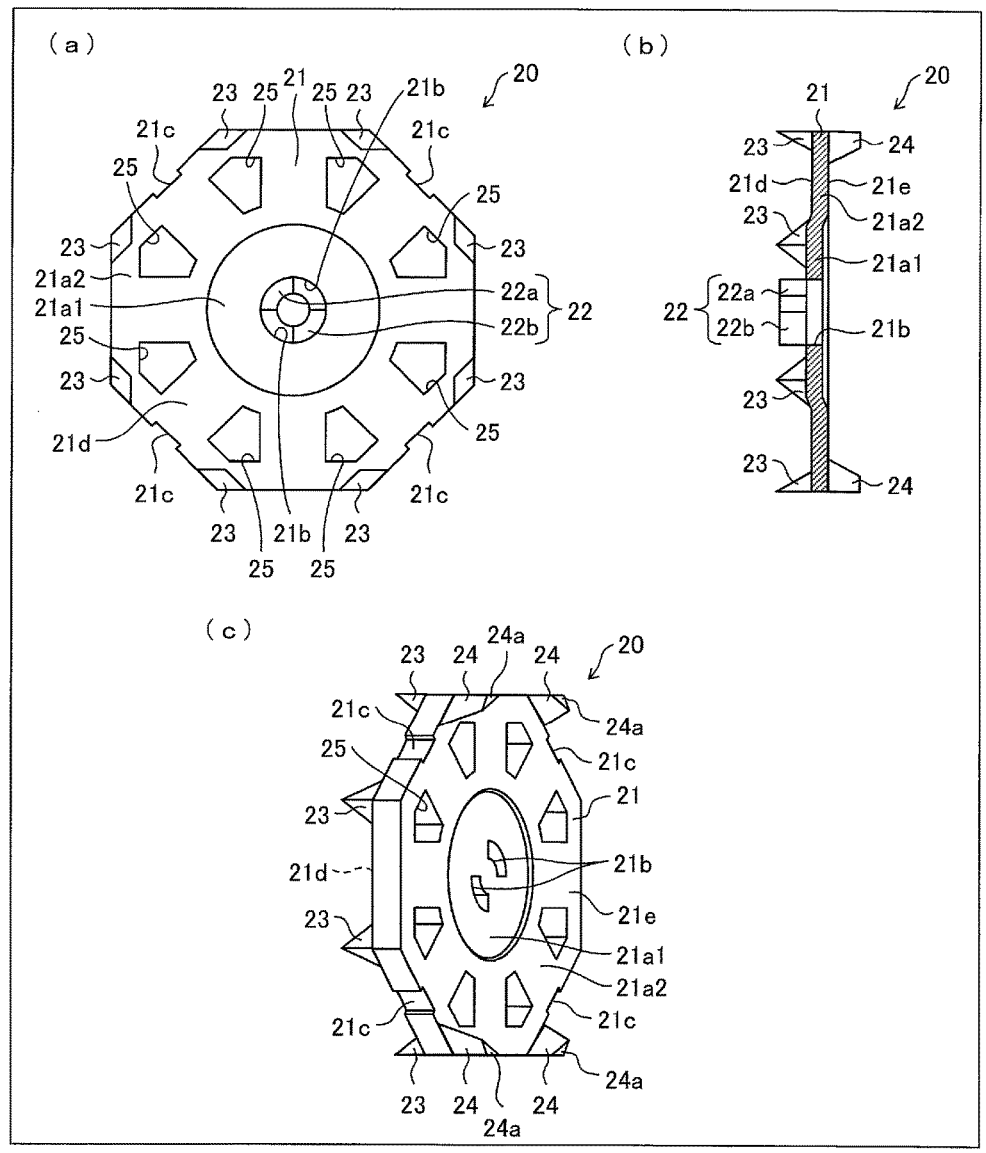
FIG. 9 provides schematic views each illustrating a configuration of a protector in accordance with Embodiment 1 of the present invention.

(a) of FIG. 9 is a plan view illustrating a configuration of a protector 20 of Embodiment 1 of the present invention. (b) of FIG. 9 is a side view illustrating a configuration of the protector 20. (c) of FIG. 9 is a perspective view illustrating a configuration of the protector 20.

The protector 20 is a protective member configured to protect a plurality of separator rolls 10 and a buffer member(s) 40, through both of which the core member 30 is inserted and which are supported by the core member 30, from damage during storage or transport.

The protector 20 may be made of any material that allows the core member 30, which supports a predetermined weight (that is, the total weight of separator rolls 10 and buffer members 40 through which the core member 30 is inserted), to be suspended by two protectors 20. The material is, for example, a hard resin. The protector 20 may be made of a material containing a resin such as an ABS resin, a polyethylene resin, a polypropylene resin, a polystyrene resin, and a vinyl chloride resin, or may be made of paper.

The protector 20 includes (i) a plate-shaped base part 21, (ii) a support part 22 at the center of the base part 21, (iii) a plurality of projections 23 on a first surface 21d of the base part 21, and (iv) a plurality of leg parts 24 on a second surface 21e of the base part 21.

The first surface 21d of the base part 21 (inward surface) is closer to a separator roll 10 on the core member 30. The second surface 21e of the base part 21 (outward surface) is farther from a separator roll 10 on the core member 30.

The base part 21 has through holes 21b, indentations 21c, and openings 25. The base part 21 includes a bulge 21a1 at a central portion thereof and a surrounding part 21a2 surrounding the bulge 21a1.

The base part 21 is larger in diameter than separator rolls 10. Thus, fitting protectors 20 with the respective ends of the core member 30 allows those protectors 20 to function as stoppers that prevent separator rolls 10 and a buffer member(s) 40 from coming off from the core member 30. The base part 21 is in the form of a plate having the shape of (i) a substantial regular polygon such as a substantial quadrangle, a substantial hexagon, or a substantial octagon or (ii) a substantial circle. The base part 21 of Embodiment 1 has the shape of a regular octagon.

The bulge 21a1 is present at the center of the base part 21 and a central portion thereof, which is a region surrounding the center. The bulge 21a1 sticks out from the surrounding part 21a2 of the base part 21. The bulge 21a1 sticks out from the surrounding part 21a2 by, for example, approximately 4 mm.

The through holes 21b are positioned around the center of the base part 21. The through holes 21b are so shaped that in a case where two protectors 20 are stacked on top of one another, the support part 22 of the lower protector 20 is inserted in the through holes 21b of the upper protector 20. The base part 21 having through holes 21b allows protectors 20 to be stacked for storage, making it possible to save space.

The through holes 21b serve the following purpose as well: In a case where an assembly fitted with protectors 20 is to be put into or taken out from a box, a human worker or robot places fingers (thumb) or robot arm in the through holes 21b to hold the assembly. The through holes 21b being closer to the center than the leg parts 24 are to the center on the second surface 21e as described above allows for a good balance. This in turn allows for production of an assembly that can be easily and stably put in and taken out from a box.

The indentations 21c are each an indentation on which a fastening band 51 (see FIG. 12) can be hooked to be wound around an assembly fitted with protectors 20. The indentations 21c are each a depression in a side surface of the base part 21. The indentations 21c have point symmetry with respect to the center of the base part 21.

The openings 25 are provided in the base part 21 in a number of two or more. The base part 21 may alternatively have only one opening 25. The openings 25 in the base part 21 allow the protector 20 to be lighter in weight. The openings 25 also allow for a reduction in the amount of resin used, making it possible to prepare protectors 20 inexpensively. The number of openings 25 in the base part 21 and the shape of the openings 25 are not limited to any particular number or shape.

The support part 22 is a protrusion from the first surface 21d of the base part 21. The support part 22 includes support parts 22a and 22b positioned in symmetry with respect to the center of the base part 21. The support part 22a and the support part 22b are separated from each other by the through holes 21b. In other words, the support part 22a, a through hole 21b, the support part 22b, and another through hole 21b are arranged in this order in a circular pattern.

The support part 22 is inserted into the axis hole 30a of the core member 30 at an end thereof. This causes the core member 30 to be fitted with a protector 20 at an end.

The projections 23 are each positioned at the edge on the first surface 21d of the base part 21. The projections 23 of Embodiment 1 are each positioned at a vertex of the regular octagon.

The projections 23 are wedge-shaped, and are each positioned at a vertex of the regular octagon. Thus, as illustrated in (c) of FIG. 9, in a case where a side of the octagonal protector 20 has been brought into contact with the floor surface, two projections 23 support the base part 21 to allow the protector 20 to stand alone. The projections 23 may have any of various shapes such as a cone shape or pillar shape other than a wedge shape.

The plurality of leg parts 24 are each a protrusion from the second surface 21e of the base part 21. The leg parts 24 are each positioned at the edge on the second surface 21e of the base part 21. The leg parts 24 of Embodiment 1 are each positioned at one of four vertices of the regular octagon. The number of leg parts 24 is not limited to four, but may be fewer than four or more than four.

The leg parts 24 are, as illustrated in (c) of FIG. 9, each provided at the edge of the second surface 21e. Thus, as illustrated in (c) of FIG. 9, in the case where a side of the octagonal protector 20 has been brought into contact with the floor surface, two leg parts 24 support the base part 21 together with two projections 23 to allow the protector 20 to stand alone stably.

The leg parts 24 of Embodiment 1 are wedge-shaped. Two projections 23 on a side of the protector 20 have respective outer surfaces that are flush with (i) the corresponding side surface of the base part 21 and (ii) the respective outer surfaces of the corresponding leg parts 24. This configuration allows the protector 20 to stand alone more stably. The leg parts 24 may have any of various shapes such as a cone shape or pillar shape other than a wedge shape.

The leg parts 24 each have a head 24a with a flat surface. The leg parts 24 are positioned in symmetry with respect to the center of the base part 21.

(Preparing and Packing Assembly)

Figure 10:
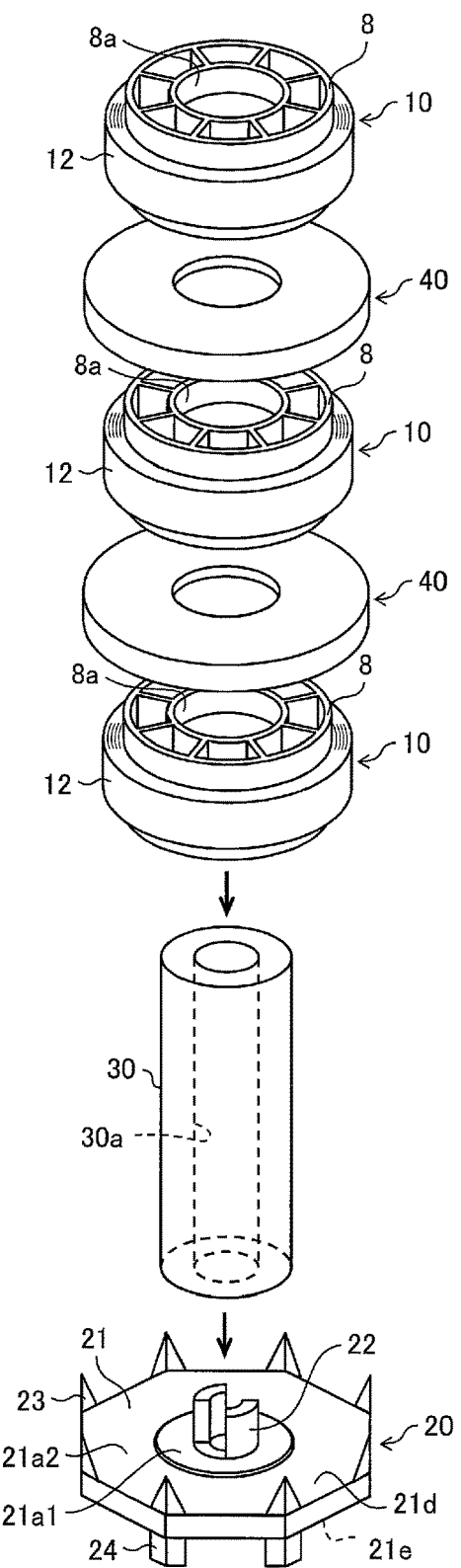
FIG. 10 is a diagram illustrating how an assembly in accordance with Embodiment 1 of the present invention is assembled.

FIG. 10 is a diagram illustrating how an assembly of Embodiment 1 of the present invention is formed. FIG. 10 illustrates separator rolls 10 produced through the separator roll producing step illustrated in (b) of FIG. 4. After preparation of a plurality of separator rolls 10, an assembly including the plurality of separator rolls 10 is prepared in an assembly step so that the plurality of separator rolls 10 prepared can be moved or stored.

During the assembly step, a protector 20 is first placed on a floor or the like such that the first surface 21d (that is, that surface of the base part 21 of the protector 20 on which the support part 22 is provided) faces upward and that the second surface 21e (that is, that surface of the base part 21 of the protector 20 which is opposite to the first surface 21d and on which the leg parts 24 [a plurality of projections] are provided) faces downward.

Then, the core member 30 is placed on the protector 20 such that the support part 22 thereof is inserted in the axis hole 30a (that is, a through hole extending in the direction in which the core member 30 extends) of the core member 30 at a first end. This causes the core member 30 to be fitted with the protector 20 at the first end (that is, a step of fitting a protector).

Next, a separator roll 10 is placed on the protector 20 such that a second end of the core member 30 (that is, an upper end thereof) enters the axis hole 8a of the separator roll 10 and that the core member 30 is consequently inserted through the axis hole 41a. Then, a buffer member 40 is placed on the separator roll 10 similarly so that the core member 30 is inserted in the axis hole 40a. Separator rolls 10 and a buffer member(s) 40 in respective predetermined numbers are alternately stacked as above with the core member 30 inserted at the center of each of the separator rolls 10 and the buffer member 40 such that a separator roll 10 is at the top of the stack.

After a predetermined number of separator rolls 10 and a predetermined number of buffer members 40 are stacked, another protector 20 is placed on a second end of the core member 30 such that the support part 22 of the other protector 20 is inserted in the axis hole 30a of the core member 30. This results in the core member 30 being fitted with a protector 20 at the second end as well (that is, a step of fitting a protector).

Figure 11:
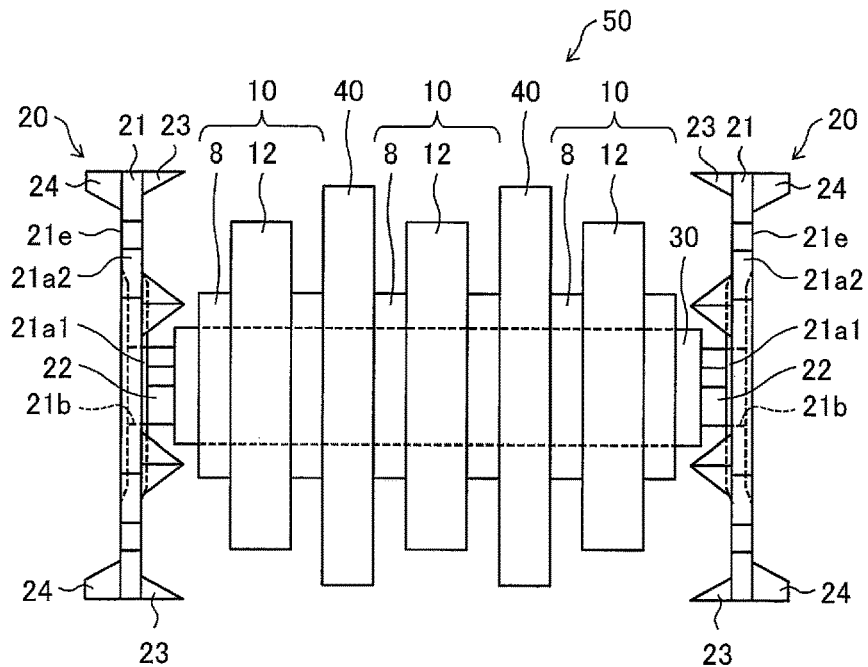
FIG. 11 is a diagram illustrating a configuration of an assembly in accordance with Embodiment 1 of the present invention.

FIG. 11 is a diagram illustrating a configuration of an assembly 50 of Embodiment 1 of the present invention. An assembly 50 can be prepared by (i) causing the core member 30 to be inserted through a predetermined number of separator rolls 10 and a buffer member(s) 40 disposed between two adjacent separator rolls 10 and (ii) fitting the core member 30 with two protectors 20 at respective opposite ends. These protectors 20 can protect the separator rolls 10 and the buffer member 40, through both of which the core member 30 is inserted, from external force.

The assembly 50 is placed horizontally as illustrated in FIG. 11 (that is, such that the assembly 50 extends in a direction parallel to the floor) during storage or transport. Further, a plurality of assemblies 50 may be stacked in a vertical direction so that a protector 20 of one assembly 50 is placed on a protector 20 of another assembly 50.

The plurality of projections 23 are, as described above, each positioned at the edge on the first surface 21d. In a case where a plurality of assemblies 50 are placed horizontally and stacked on top of one another such that an upwardly facing side surface of a protector 20 of one assembly 50 is in contact with a downwardly facing side surface of a protector 20 of an adjacent assembly 50, the projections 23 can prevent a slightly displaced protector 20 from coming into contact with and damaging the separator 12 of a separator roll 10 of an adjacent assembly 50.

Further, the base part 21 of each protector 20 having the shape of a regular polygon prevents an assembly 50 including protectors 20 from rolling over easily in a case where the assembly 50 is placed horizontally, and thus allows the assembly 50 to be handled easily.

With the base part 21 having the shape of a regular octagon, in a case where an assembly 50 is placed horizontally, the base part 21 has (i) a downwardly facing side surface in contact with the floor and (ii) an opposite surface, that is, an upwardly facing side surface, also parallel to the floor. This configuration allows assemblies 50 to be stacked easily.

Further, with the base part 21 having the shape of a regular octagon, in the case where an assembly 50 is placed horizontally, the octagonal base part 21 has two sides perpendicular to the floor. This configuration allows assemblies 50 to be arranged in parallel to one another with no unnecessary gap therebetween such that each protector 20 of each assembly 50 has a side perpendicular to the floor which side is in contact with a side of an adjacent protector 20 which side is perpendicular to the floor. The above configuration consequently allows a plurality of assemblies 50 to be arranged efficiently. This advantage is achievable also in a case where the base part 21 has the shape of a substantial regular rectangle.

Each protector 20 includes a bulge 21a1 at a central portion thereof, the bulge 21a1 sticking out from a surrounding part 21a2.

With the above configuration, in a case where the core member 30 has been fitted with a protector 20, the bulge 21a1 is in contact with the core 8 of a separator roll 10 on the core member 30, whereas the surrounding part 21a2, which surrounds the bulge 21a1, is apart from the separator roll 10 in comparison to the bulge 21a1.

In a case where an assembly 50 is in the normal state (that is, with no external force applied thereto), the surrounding part 21a2 is in no contact with the separator 12 of a separator roll 10 supported by the core member 30. With this configuration, in a case where external force has been applied to an assembly 50, the bulge 21a1 of each protector 20 absorbs the impact and thus prevents the external force from being applied from the surrounding part 21a2 to a separator 12.

Figure 12:
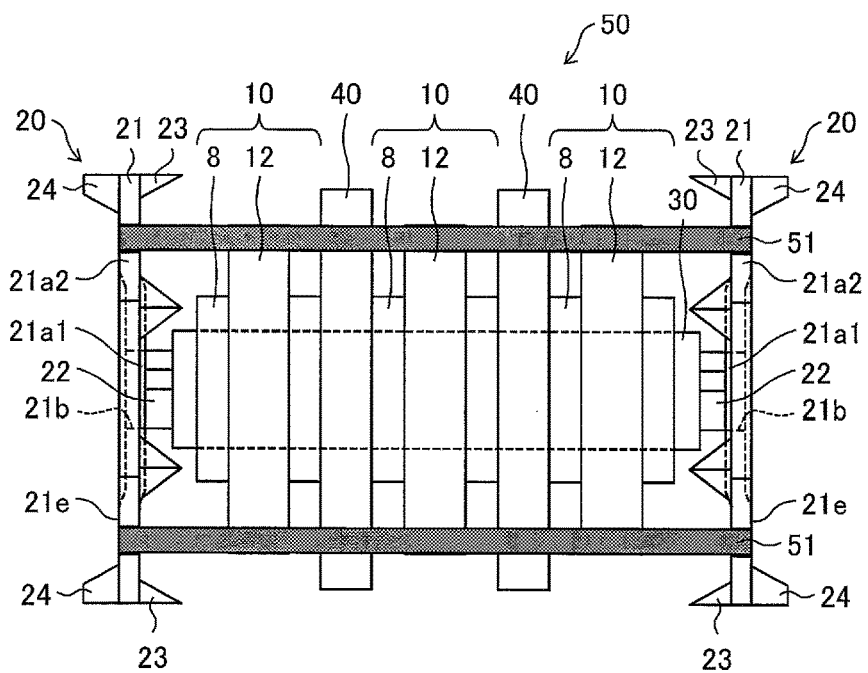
FIG. 12 is a diagram illustrating the assembly as fastened with fastening bands.

FIG. 12 is a diagram illustrating an assembly 50 as fastened with fastening bands 51. After an assembly 50 is formed in the assembly step, the assembly 50 is fastened in a subsequent fastening step. The fastening step involves (i) hooking belt-shaped fastening bands 51 on the indentations 21c of the two protectors 20 and (ii) winding one or more turns of each fastening band 51 around the assembly 50. This causes the two protectors 20, which are positioned at the respective opposite ends of the core member 30, and the plurality of separator rolls 10 and a buffer member(s) 40, which are positioned between the protectors 20, to be fastened with the fastening bands 51. Hooking the fastening bands 51 on the indentations 21c as described above can prevent the fastening bands 51 from being displaced during, for example, transport of the assembly 50.

The fastening bands 51 are, for example, each a PP band made of a polypropylene (PP) resin or a stretch film.

A stretch film, in particular, is thin, and can be easily broken manually (that is, without the need to use a tool such as scissors). The use of a stretch film thus allows the assembly 50 to be disassembled easily, and also allows the separator rolls 10, through which the core member 30 is inserted, to be removed readily.

Further, a stretch film, which is stretchable, is deformed in correspondence with the shape of the protectors 20 in a case where the stretch film is wound around an assembly 50. A stretch film can thus be easily wound around the assembly 50.

Before or after an assembly 50 is fastened with fastening bands 51, the assembly 50 with the fastening bands 51 may be covered in its entirety with a thin film, for example. This can protect the assembly 50 from adhesion of foreign matter.

After an assembly 50 is fastened with fastening bands 51 in the fastening step, the assembly 50 is stored in a box in a storage step. The assembly 50 may be stored in a box by a robot or human worker.

The storage step involves a robot arm holding or a human worker manually holding the respective second surfaces 21e (outward surfaces) of the two protectors 20 and placing the assembly 50 in a box. The assembly 50 is contained in the box for storage or transport.

The protectors 20 in the assembly 50 each include a plurality of leg parts 24 (projections) on the second surface 21e (outward surface). The leg parts 24 secure space between the second surface 21e of each protector 20 and an inner surface of the box. This configuration protects an assembly 50 stored in a box from a shake during transport, and allows the assembly 50 to be placed in or taken out from the box easily.

Specifically, the leg parts 24 of each protector 20 extend in a direction that is not parallel to the second surface 21e of the base part 21 as described above. The leg parts 24 of Embodiment 1 extend in a direction perpendicular to the second surface 21e of the base part 21. The leg parts 24, in other words, do not extend along the second surface 21e of the base part 21, but are so shaped as to rise from the second surface 21e of the base part 21.

With the above configuration, in a case where a human worker or robot uses a hand or robot arm to hold the second surface 21e of the base part 21 (that is, an outer surface of the assembly 50) to place the assembly 50 in or take the assembly 50 out from a box, the human worker or robot can insert the hand or robot arm through between the leg parts 24 to hold a central portion of the second surface 21e.

The above configuration can thus prevent the leg parts 24 from blocking the hand or robot arm.

The above configuration consequently allows a worker or robot to hold the second surface 21e of the base part 21 easily and thus to place the assembly 50 in or take the assembly 50 out from a box easily. This allows a worker or robot to place the assembly 50 in or take the assembly 50 out from a box efficiently as a result.

A worker or robot may alternatively hold a leg part 24 to place the assembly 50 in or take the assembly 50 out from a box. A worker or robot can hold a leg part 24 easily because the leg parts 24 are apart from one another and extend in a direction that is not parallel to the second surface 21e.

An assembly 50 is oriented vertically while, for example, it is still being assembled as described above or stored, or when a separator roll 10 is removed from the assembly 50. An assembly 50 being oriented vertically means that the assembly 50 is so oriented as to extend in a direction perpendicular to the floor (that is, the direction in which the core member 30 extends as illustrated in FIG. 10).

In a case where an assembly 50 is placed vertically as described above, one of the protectors 20 is in contact with a floor. The leg parts 24 of the protector 20, which have symmetry with respect to the center of the protector 20, allow the assembly 50 to be placed vertically in a stable manner.

Further, the leg parts 24 each having a head 24*a* with a flat surface allow the assembly 50 to be placed vertically in a more stable manner.

(Main Advantages of Method of Producing Assembly 50)

A method of Embodiment 1 for producing an assembly 50, as described above with reference to FIG. 10, includes a step (assembly step) of inserting a pillar-shaped core member 30 into (i) the axis hole 8*a* in the core 8 of each of a plurality of separator rolls 10 and (ii) the axis hole 40*a* in at least one buffer member 40 such that the separator rolls 10, each of which includes a core 8 and a separator 12 wound around the core 8, and the buffer member 40 are arranged alternately.

Stated differently, an assembly 50 includes (i) a plurality of separator rolls 10, (ii) a buffer member(s) 40 disposed between two adjacent separator rolls 10, and (iii) a pillar-shaped core member 30 inserted in the axis hole 8*a* in the core 8 of each of the plurality of separator rolls 10 and the axis hole 40*a* in the buffer member 40 to support the plurality of separator rolls 10 and the buffer member 40.

The above configuration, in which the pillar-shaped core member 30 is inserted in the axis hole 8*a* in the core 8 of each of the plurality of separator rolls 10 and the axis hole 40*a* in the buffer member 40, allows the core member 30 to support the plurality of separator rolls 10 and the buffer member 40, with the result of increased convenience in storage and transport of the plurality of separator rolls 10.

Further, with the above configuration, the core member 30 is inserted in the axis hole 8*a* of each of the plurality of separator rolls 10 and the axis hole 40*a* in the buffer member 40 such that the separator rolls 10 and the buffer member 40 are arranged alternately. An assembly 50 as a finished product thus includes a buffer member 40 between two adjacent separator rolls 10. With this configuration, in a case where external force such as impact or shake has been applied to separator rolls 10 during transport, a buffer member 40 disposed between two adjacent separator rolls 10 can absorb such external force. The above method therefore allows for production of an assembly capable of protecting a film from external force during, for example, transport.

The number of buffer members 40 through which the core member 30 is inserted may be (i) one or (ii) two or more as long as two adjacent separator rolls 10 are separated from each other by a buffer member 40. The assembly 50 preferably includes a buffer member 40 disposed between each adjacent two of the separator rolls 10.

The buffer member 40 is preferably made of a porous material such as sponge and urethane foam. A buffer member 40 made of a porous material has an increased fractional force. This can prevent the buffer member 40 and an adjacent separator roll 10, through both of which the core member 30 is inserted, from sliding over each other by presenting shaking thereof during, for example, transport in a case where the assembly 50 has been shaken, and can thus prevent a change of the respective positions relative to each other.

The above configuration can consequently prevent the core 8 or separator 12 of a separator roll 10 or a buffer member 40 adjacent thereto from being broken as a result of the buffer member 40 and the adjacent separator roll 10 rubbing against each other. The above configuration can further prevent foreign matter from being generated as a result of the buffer member 40 and the separator roll 10 rubbing against each other.

The buffer member 40 has an outer diameter larger than the outer diameter of each separator roll 10. This allows the buffer member 40 to protect the separator roll 10 in its entirety. The buffer member 40 can, in particular, more reliably protect the separator 12 of the separator roll 10, which separator 12 is wound around the core 8.

As described above with reference to (b) of FIG. 4 and (b) of FIG. 6, the step of preparing a separator roll 10 includes (i) a step of preparing a separator 12 (film) to be wound around a core 8 by cutting an original sheet such that the resulting separator 12 will have a width $L_{11}$ smaller than the width $L_{12}$ of the core 8 and (ii) a step of preparing a separator roll 10 by winding the separator 12 around a core 8 such that the opposite end surfaces 8*s*1 and 8*s*2 of the core 8 protrude respectively from the opposite end surfaces 12*s*1 and 12*s*2 of the separator 12 wound around the core 8.

A separator roll 10 prepared as above includes a core 8 having opposite end surfaces 8*s*1 and 8*s*2 that protrude respectively from the opposite end surfaces 12*s*1 and 12*s*2 of the separator 12 wound around the core 8. This configuration secures a space between (i) the opposite end surfaces 12*s*1 and 12*s*2 of the separator 12 wound around the core 8 and (ii) each buffer member 40 adjacent to the separator 12 or a protector 20 in the normal state (that is, with no external force applied).

The above configuration can prevent or reduce contact between (i) the opposite end surfaces 12*s*1 and 12*s*2 of the separator 12 wound around the core 8 and (ii) each buffer member 40 adjacent to the separator 12 or a protector 20. The above configuration can consequently prevent or reduce deformation of a separator 12 in a case where (i) external force has been applied to the assembly 50 in the direction in which the core member 30 extends and as a result, (ii) the separator 12 and a buffer member 40 adjacent to the separator 12 or a protector 20 have rubbed against each other.

[Embodiment 2]

Embodiment 2 of the present invention will be described below with reference to FIGS. 13 and 14. For convenience of explanation, any member of Embodiment 2 that is identical in function to a corresponding member described for Embodiment 1 is assigned a common reference numeral, and a description thereof is omitted.

Figure 13:
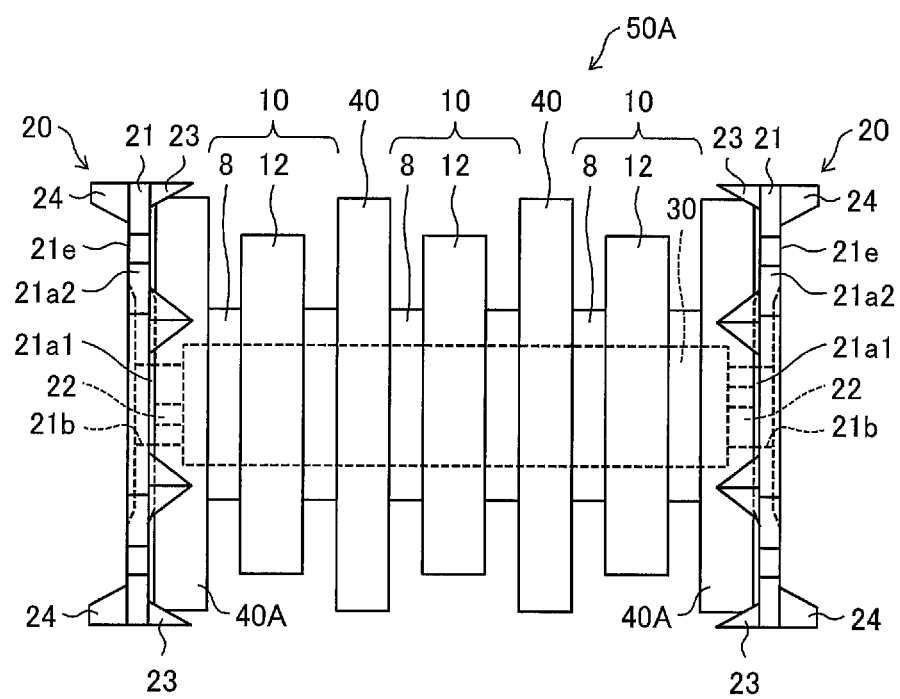
FIG. 13 is a diagram illustrating a configuration of an assembly in accordance with Embodiment 2 of the present invention.

FIG. 13 is a diagram illustrating a configuration of an assembly 50A of Embodiment 2 of the present invention. The assembly 50A, as illustrated in FIG. 13, differs in configuration from the assembly 50 (see FIG. 11) in that the assembly 50A includes two additional buffer members (second buffer members) 40A. The assembly 50A is otherwise similar in configuration to the assembly 50.

The buffer members 40A are each positioned between (i) one of the protectors 20 with which the core member 30 is fitted at the respective opposite ends and (ii) a separator roll 10 adjacent to the protector 20. The buffer members 40A are made of a flexible material. The buffer members 40A are similar to the buffer member 40 in terms of, for example, the material and shape. The buffer members 40A may alternatively differ from the buffer member 40 in terms of the material or shape; for example, the buffer members 40A may be thicker than the buffer member 40.

A production method for preparing an assembly 50A includes, in addition to the steps of preparing an assembly 50, a step of inserting the core member 30 into the axis hole of each buffer member 40A so that the buffer member 40A is positioned between a protector 20 and a separator roll 10 adjacent to the protector 20.

Specifically, the assembly step described above with reference to FIG. 10 is modified as follows: A protector 20 is first placed on a floor or the like. Then, the core member 30 is placed on the protector 20 such that the support part 22 thereof is inserted in the axis hole 30a of the core member 30 at a first end. Next, a buffer member 40A is placed on the protector 20 such that a second end of the core member 30 (that is, an upper end thereof) enters the axis hole of the buffer member 40A and that the core member 30 is consequently inserted through the axis hole of the buffer member 40A. After that, separator rolls 10 and a buffer member(s) 40 are stacked alternately with the core member 30 inserted at the center of each of the separator rolls 10 and the buffer member 40. After separator rolls 10 and a buffer member(s) 40 in respective predetermined numbers are stacked alternately such that a separator roll 10 is at the top of the stack, another buffer member 40A is placed on the uppermost separator roll 10. Then, another protector 20 is placed on the second end of the core member 30 such that the support part 22 of the other protector 20 is inserted in the axis hole 30a of the core member 30. This results in the core member 30 being fitted with a protector 20 at the second end as well.

The buffer members 40A are each provided between a protector 20 and an adjacent separator roll 10 as described above. With this configuration, the buffer members 40A can each absorb external force to the assembly 50A to protect the protector 20 and the separator roll 10. The above configuration can thus prevent the protector 20 and the separator roll 10 from being broken as a result of the separator roll 10 coming into contact with or rubbing against the protector 20.

In particular, a buffer member 40A between a protector 20 and a separator 12 can prevent the separator 12 from being damaged as a result of the protector 20 and the separator 12 coming into contact with and rubbing against each other.

Further, the combined width of (i) two buffer members 40A, (ii) a predetermined number of separator rolls 10, and (ii) a predetermined number of buffer members 40, through which the core member 30 is inserted, is preferably larger than the length $L_3$ (see FIG. 8) of the core member 30 along its extending direction.

At least one end of the core member 30 is fitted with a protector 20 such that the buffer member 40A adjacent to the protector 20 is pressed. This arrangement, in the state where the core member 30 is fitted with two protectors 20 at the opposite ends, causes inward pressing force to be applied to the two buffer members 40A, the predetermined number of separator rolls 10, and the predetermined number of buffer members 40, which are supported by the core member 30, in the direction in which the core member 30 extends. The above arrangement consequently causes the two buffer members 40A, the predetermined number of separator rolls 10, and the predetermined number of buffer members 40, which are positioned between the two protectors 20, to be in contact with one another.

The following description will discuss an issue involved in a case where a protector is separated by a gap from a member adjacent to the protector.

Figure 14:
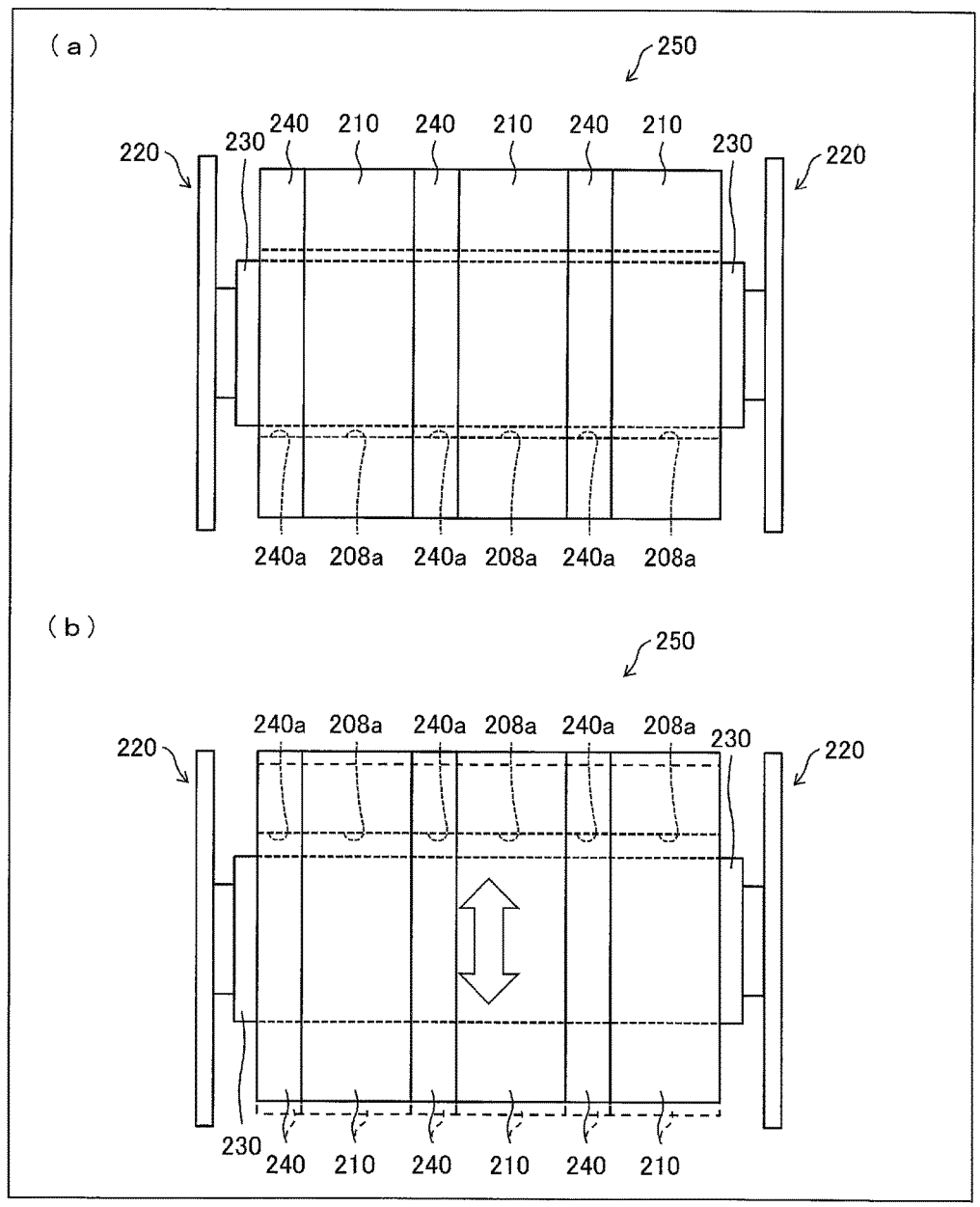
FIG. 14 provides diagrams each illustrating a configuration of an assembly in accordance with a comparative example.

(a) of FIG. 14 is a diagram illustrating an assembly 250 as a comparative example in a resting state. (b) of FIG. 14 is a diagram illustrating an assembly 250 being shaken by external force.

The assembly 250 includes a tube-shaped core member 230 so inserted through the respective axis holes 240a of buffer members 240 and the respective axis holes 208a of separator rolls 210 alternately as to support the buffer members 240 and the separator rolls 210. The core member 230 is fitted with two protectors 220 at respective opposite ends. The protectors 220 are each separated by a gap from a buffer member 240 or separator roll 210 adjacent to the protector 220.

As illustrated in (b) of FIG. 14, in a case where the protectors 220 are each separated by a gap from a buffer member 240 or separator roll 210 adjacent to the protector 220, a shake of the assembly 250 causes a separator roll 210 and a buffer member 240 adjacent to each other to (i) be shaken such that the respective positions relative to each other are changed with the core member 230 at the center and to (ii) rub against each other as a result. This is due to the separator rolls 210 and the buffer members 240 being designed to have respective axis holes 208a and axis holes 240a that are larger in diameter to a degree than the core member 230 to facilitate insertion of the core member 230.

A separator roll 210 and a buffer member 240 rubbing against each other as above may cause the separator roll 210 and/or the buffer member 240 to be broken.

The assembly 50A illustrated in FIG. 13 is, in contrast, configured such that the two protectors 20 at the respective opposite ends of the core member 30 each apply pressing force to the buffer member 40A adjacent to the protector 20 toward the center of the core member 30.

With the above configuration, a shake of the assembly 50A does not cause the individual members supported by the core member 30 to be shaken, or merely causes the individual members (namely, the buffer members 40A and 40 and the separator rolls 10) to be shaken as a whole and does not change the respective positions relative to one another. The above configuration can thus prevent a separator roll 10 from rubbing against an adjacent member (namely, a buffer member 40 or a buffer member 40A).

The assembly 50A is, as described above, configured such that a buffer member(s) 40 is present between adjacent separator rolls 10 supported by the core member 30 and that a buffer member 40A is present between each protector 20 and an adjacent separator roll 10.

The above configuration allows for a large fractional force between the separator rolls 10 and the buffer members 40 as well as between the protectors 20, the buffer members 40A, and the separator rolls 10 adjacent to the buffer members 40A.

As a result, a shake of the assembly 50A does not cause the individual members supported by the core member 30 to be shaken, or merely causes the individual members (namely, the buffer members 40A and 40 and the separator rolls 10) to be shaken as a whole and does not change the respective positions relative to one another.

This effect would be unachievable in a case where a buffer member were provided only either between the separator rolls or between the protectors and the separator rolls adjacent to the protectors.

Further, using a porous material with a relatively large frictional force as a material of the buffer members 40 and 40A can more reliably prevent the individual members (namely, the buffer members 40A and 40 and the separator rolls 10) sandwiched between the protectors 20 from being so shaken that the respective positions relative to one another are changed.

[Embodiment 3]

Embodiment 3 of the present invention will be described below with reference to FIGS. 15 and 16. For convenience of explanation, any member of Embodiment 3 that is identical in function to a corresponding member described for Embodiment 1 or 2 is assigned a common reference numeral, and a description thereof is omitted.

Figure 15:
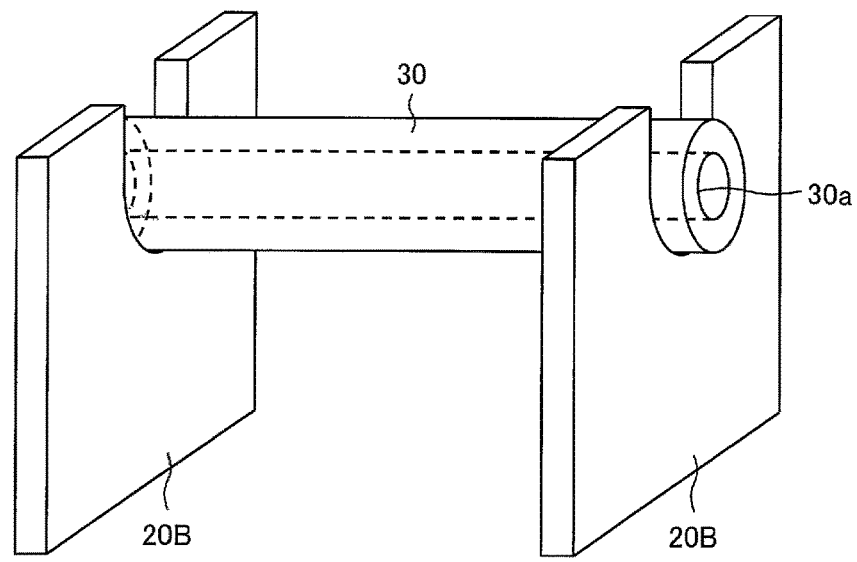
FIG. 15 is a perspective view illustrating a configuration of protectors in accordance with Embodiment 3 of the present invention.

FIG. 15 is a perspective view illustrating a configuration of protectors 20B of Embodiment 3 of the present invention.

The protectors 20B are, as illustrated in FIG. 15, each a plate-shaped member, and each have an upper end surface with a U-shaped depression to support the core member 30. The protectors 20B support the core member 30 such that each end of the core member 30 is placed in one of the U-shaped depressions. The protectors 20B can be made of, for example, strong paper such as corrugated cardboard.

The protectors 20B have a lower strength than the protectors 20 (which are made of resin or the like), but are more inexpensive than the protectors 20, as the protectors 20B are made of paper.

Figure 16:
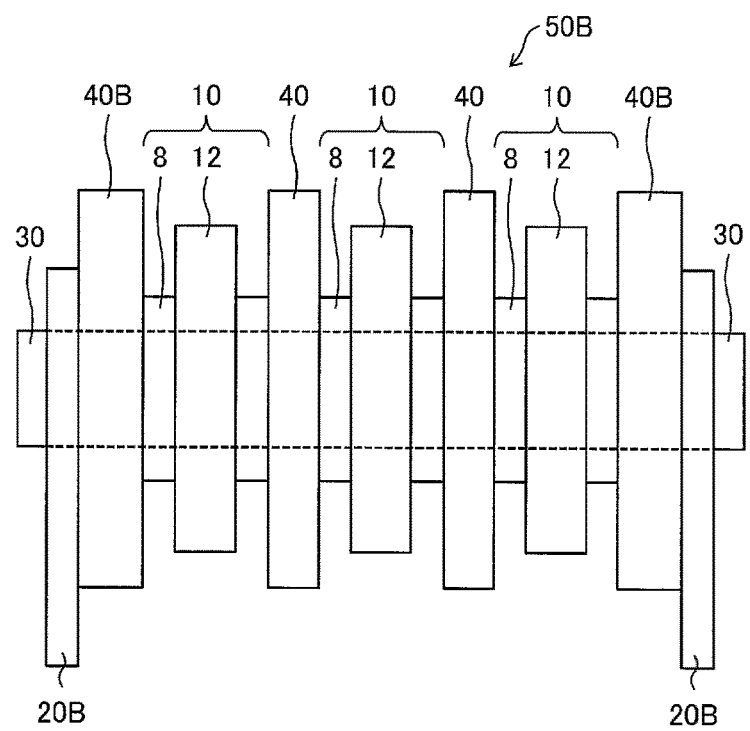
FIG. 16 is a diagram illustrating a configuration of an assembly in accordance with Embodiment 3 of the present invention.

FIG. 16 is a diagram illustrating a configuration of an assembly 50B of Embodiment 3 of the present invention. The assembly 50B, as illustrated in FIG. 16, differs from the assembly 50A in that the protectors 20 and buffer members 40A of the assembly 50A (see FIG. 13) are replaced respectively with protectors 20B and buffer members (second buffer members) 40B. The assembly 50B is otherwise similar in configuration to the assembly 50A. Further, the assembly 50B can be assembled by a method similar to that for the assembly 50A.

The buffer members 40B are made of a flexible material, and have a higher strength than the buffer member 40. The buffer members 40B are produced by, for example, (i) using a material having a higher strength than the buffer member 40, (ii) using a porous material having a higher density, or (ii) producing thicker buffer members 40.

The above configuration can, even in a case where the protectors 20B have a lower strength than the protectors 20, protect separator rolls 10 supported by the core member 30 from external force.

The buffer members 40B are thicker than the buffer member 40, and can thus occupy more space between the assembly 50B (specifically, the respective outward surfaces of the protectors 20B) and an inner surface of a box in which the assembly 50B is stored. This configuration can prevent the assembly 50B from being shaken inside the box during transport of the assembly 50B as stored in the box.

The protectors 20B each have the shape of a flat plate, and do not have a bulge like the bulge 21a1 of each protector 20. With this configuration, external force applied to the assembly 50B could likely deform a protector 20B as compared to the protectors 20 and cause the protector 20B to press a separator 12 with another member in-between.

In view of that, the buffer members 40B being thicker than the buffer member 40 allows the buffer members 40B to sufficiently function as a cushion. With this configuration, even in a case where (i) the protectors 20B each have the shape of a flat plate and (ii) external force applied has deformed a protector 20B and a buffer member 40B adjacent to the protector 20B, the buffer member 40B can absorb such external force to prevent the protector 20B from pressing an adjacent, separator 12 indirectly.

[Recap]

A method of an embodiment of the present invention for producing an assembly is a method for producing an assembly including (i) a core member having a pillar shape, (ii) a plurality of rolls each of which includes a core and a film wound around the core and has an axis hole, and (iii) at least one first buffer member made of a flexible material and having an axis hole, the method including the step of: (a) inserting the core member through the respective axis holes of the rolls and the axis hole of the at least one first buffer member for an alternate arrangement of the rolls and the at least one first buffer member.

An assembly of an embodiment of the present invention is an assembly, including: a plurality of rolls each including a core and a film wound around the core; at least one first buffer member made of a flexible material and provided between two mutually adjacent ones of the rolls; and a core member having a pillar shape, the core member extending through respective axis holes of the rolls and an axis hole of the at least one first buffer member and supporting the rolls and the at least one first buffer member.

The above configurations, in each of which the pillar-shaped core member is inserted in the axis hole of each of the plurality of rolls and the axis hole of the at least one first buffer member, each allow the core member to support the plurality of rolls and the at least one first buffer member, with the result of increased convenience in storage and transport of the plurality of rolls. Further, with each of the above configurations, the core member is inserted in the axis hole of each of the plurality of rolls and the axis hole of the at least one first buffer member such that the rolls and the first buffer member are arranged alternately. An assembly as a finished product thus includes a first buffer member between two adjacent rolls. With this configuration, in a case where external force such as impact or shake has been applied to rolls during transport, a first buffer member disposed between two adjacent rolls can absorb such external force. The above configurations therefore each allow for production of an assembly capable of protecting a film from external force during, for example, transport.

The method may preferably be arranged such that the flexible material is a porous material. With this arrangement, the at least one first buffer member has an increased frictional force. This can prevent the at least one first buffer member and an adjacent roll, through both of which the core member is inserted, from sliding over each other during, for example, transport in a case where the assembly has been shaken, and can thus prevent a change of the respective positions relative to each other. The above arrangement can consequently prevent the rolls from being broken as a result of the at least one first buffer member and an adjacent roll rubbing against each other. The above arrangement can further prevent foreign matter from being generated as a result of the at least one first buffer member and a roll rubbing against each other.

The method may preferably be arranged such that the at least one first buffer member has an outer diameter larger than an outer diameter of each of the rolls. This arrangement allows the at least one first buffer member to reliably protect, in particular, the film of a roll, the film being wound around a core.

The method may preferably further include the steps of: (b) preparing the film by cutting an original sheet for a product having a width smaller than a width of the core; and (c) preparing each of the rolls by winding the film around the core such that the core has opposite end surfaces protruding from respective opposite end surfaces of the film.

With the above arrangement, the core has opposite end surfaces protruding from the respective opposite end surfaces of a film wound around the core. This can prevent or reduce contact between (i) the opposite end surfaces of a film wound around a core and (ii) each first buffer member adjacent to the film or a protector. The above arrangement can consequently prevent or reduce deformation of a film in a case where (i) external force has been applied to the assembly and as a result, (ii) the film and a first buffer member adjacent to the film or a protector have rubbed against each other.

The method may preferably further include the step of: (d) fitting opposite ends of the core member with respective protectors configured to protect the rolls and the at least one first buffer member. With this arrangement, the opposite ends of the core member are fitted with respective protectors. The protectors can thus protect the plurality of rolls and the at least one first buffer member from external force.

The method may preferably further include the step of: (e) inserting the core member through respective axis holes of second buffer members, the second buffer members being each made of a flexible material, such that the protectors are each separated from an adjacent one of the rolls by one of the second buffer members. With this arrangement, the second buffer members are each provided between a protector and an adjacent roll, and can each absorb external force to the assembly to protect the protector and the adjacent roll. The above arrangement can thus prevent the rolls from being broken as a result of a roll coming into contact with or rubbing against a protector.

The method may preferably be arranged such that in the step (d), the protectors are Inserted Into the respective opposite ends of the core member in such a manner as to each press a member adjacent to the protector.

In a case where the protectors are each separated by a gap from a member adjacent to the protector (namely, a second buffer member or a roll), a shake of the assembly causes a roll and a first buffer member adjacent to each other to (i) be shaken such that the respective positions relative to each other are changed with the core member at the center and to (ii) rub against each other as a result. This may break the roll and/or the first buffer member.

With the above arrangement, the two protectors at the respective opposite ends of the core member each apply pressing force to a member adjacent to the protector toward the center of the core member. With the above arrangement, a shake of the assembly does not cause the individual members supported by the core member to be shaken, or merely causes the individual members to be shaken as a whole and does not change the respective positions relative to one another. This can prevent a roll from rubbing against a member adjacent to the roll.

The method may preferably be arranged such that the protectors each include a bulge at a central portion thereof, the bulge sticking out from a part surrounding the bulge.

With the above arrangement, the bulge sticks out from a part surrounding the bulge, causing the surrounding part to be apart from a roll in comparison to the bulge. This can prevent external force from being applied from the protectors to the film of a roll, the film being wound around a core, directly or via a second buffer member in a case where external force has been applied to the assembly.

The method may preferably be arranged such that the second buffer members are each thicker than the at least one first buffer member. This arrangement can occupy more space between the assembly and an inner surface of a box in which the assembly is stored. The above arrangement can thus prevent the assembly from being shaken inside the box during transport of the assembly as stored in the box. Further, the above arrangement can more reliably protect, in particular, a roll among the plurality of rolls that is positioned at an end and that is thus likely subjected to external force.

The method may preferably be arranged such that the flexible material of the second buffer members has a strength higher than a strength of the flexible material of the at least one first buffer member. This arrangement can protect the rolls supported by the core member from external force even in a case where the protectors have a low strength.

The method may preferably further include the step of: (f) fastening, with a belt-shaped member, the protectors, with which the respective opposite ends of the core member are fitted, and all members through which the core member is inserted.

The method may preferably be arranged such that the belt-shaped member is a stretch film. This arrangement allows the belt-shaped member to be easily broken manually (that is, without the need to use a tool such as scissors). The use of a stretch film thus allows the assembly to be disassembled easily, and also allows the rolls to be removed from the core member readily.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

REFERENCE SIGNS LIST

1 Lithium-ion secondary battery
2 External device
3 Lithium ion
4 Heat-resistant layer
5 Porous film
6 Slitting apparatus
7 Cutting device
8, u, 1 Core
8a, 30a, 40a, 41a Axis hole
8s1, 8s2, 12s1, 12s2 End surface
10 Separator roll
11 Cathode
12 Separator
13 Anode
20, 20B Protector
21 Base part
21a1 Bulge
21a2 Surrounding part
22, 22a, 22b Support part
23 Projection
24 Leg part
24a Head
25 Opening
30 Core member
31, 41 Central axis
40 Buffer member (first buffer member)
40A, 40B Buffer member (second buffer member)
50, 50A, 50B Assembly
51 Fastening band (belt-shaped member)

The invention claimed is:

1. A method for producing an assembly including (i) a core member having a pillar shape, (ii) a plurality of rolls each of which includes a core and a film wound around the core and has an axis hole, and (iii) at least one first buffer member made of a flexible material and having an axis hole, the method comprising the steps of:

inserting the core member through the respective axis holes of the rolls and the axis hole of the at least one first buffer member for an alternate arrangement of the rolls and the at least one first buffer member;

fitting opposite ends of the core member with respective protectors configured to protect the rolls and the at least one first buffer member, the protectors being inserted into the respective opposite ends of the core member in such a manner as to each press a member adjacent to the protector; and inserting the core member through respective axis holes of second buffer members, the second buffer members being each made of a flexible material, such that the protectors are each separated from an adjacent one of the rolls by one of the second buffer members.

2. The method according to claim 1,
wherein
the flexible material is a porous material.

3. The method according to claim 1,
wherein
the at least one first buffer member has an outer diameter larger than an outer diameter of each of the rolls.

4. The method according to claim 1, further comprising the steps of:
preparing the film by cutting an original sheet for a product having a width smaller than a width of the core; and
preparing each of the rolls by winding the film around the core such that the core has opposite end surfaces protruding from respective opposite end surfaces of the film.

5. The method according to claim 1,
wherein
the flexible material of the second buffer members has a strength higher than a strength of the flexible material of the at least one first buffer member.

6. A method for producing an assembly including (i) a core member having a pillar shape, (ii) a plurality of rolls each of which includes a core and a film wound around the core and has an axis hole, and (iii) at least one first buffer member made of a flexible material and having an axis hole, the method comprising the step of:
inserting the core member through the respective axis holes of the rolls and the axis hole of the at least one first buffer member for an alternate arrangement of the rolls and the at least one first buffer member,
fitting opposite ends of the core member with respective protectors configured to protect the rolls and the at least one first buffer member;
wherein
the protectors each include a bulge at a central portion thereof, the bulge sticking out from a part surrounding the bulge.

7. A method for producing an assembly including (i) a core member having a pillar shape, (ii) a plurality of rolls each of which includes a core and a film wound around the core and has an axis hole, and (iii) at least one first buffer member made of a flexible material and having an axis hole, the method comprising the step of:
inserting the core member through the respective axis holes of the rolls and the axis hole of the at least one first buffer member for an alternate arrangement of the rolls and the at least one first buffer member;
fitting opposite ends of the core member with respective protectors configured to protect the rolls and the at least one first buffer member,
inserting the core member through respective axis holes of second buffer members, the second buffer members being each made of a flexible material, such that the protectors are each separated from an adjacent one of the rolls by one of the second buffer members;
wherein
the second buffer members are each thicker than the at least one first buffer member.

8. A method for producing an assembly including (i) a core member having a pillar shape, (ii) a plurality of rolls each of which includes a core and a film wound around the core and has an axis hole, and (iii) at least one first buffer member made of a flexible material and having an axis hole, the method comprising the step of:
inserting the core member through the respective axis holes of the rolls and the axis hole of the at least one first buffer member for an alternate arrangement of the rolls and the at least one first buffer member,
fitting opposite ends of the core member with respective protectors configured to protect the rolls and the at least one first buffer member, and
fastening, with a belt-shaped member, the protectors, with which the respective opposite ends of the core member are fitted, and all members through which the core member is inserted.

9. The method according to claim 8,
wherein
the belt-shaped member is a stretch film.

* * * * *